US007006449B2

(12) United States Patent
Teraoka

(10) Patent No.: US 7,006,449 B2
(45) Date of Patent: Feb. 28, 2006

(54) INFORMATION PROCESSING DEVICE, METHOD THEREOF, AND RECORDING MEDIUM

(75) Inventor: Fumio Teraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 941 days.

(21) Appl. No.: 09/759,427

(22) Filed: Jan. 12, 2001

(65) Prior Publication Data

US 2001/0028647 A1 Oct. 11, 2001

(30) Foreign Application Priority Data

Jan. 14, 2000 (JP) ............................ P2000-005560

(51) Int. Cl.
H04J 1/16 (2006.01)
(52) U.S. Cl. ...................... 370/252; 370/278; 370/331; 445/436
(58) Field of Classification Search ................ 370/389, 370/328, 329, 331, 352, 400, 401, 252, 466, 370/467, 412, 278, 386, 463; 714/4; 709/224, 709/225, 220–222; 455/436–444, 413; 707/103 R; 379/59; 710/68; 715/773; 717/171; 358/539
See application file for complete search history.

(56) References Cited

U.S. PATENT DOCUMENTS

| 5,610,973 | A | * | 3/1997 | Comer | ........................ 455/413 |
| 6,108,727 | A | * | 8/2000 | Boals et al. | ................... 710/68 |
| 6,160,804 | A | * | 12/2000 | Ahmed et al. | .............. 370/349 |
| 6,279,153 | B1 | * | 8/2001 | Bi et al. | ...................... 717/171 |
| 6,400,722 | B1 | * | 6/2002 | Chuah et al. | ............... 370/401 |
| 6,577,643 | B1 | * | 6/2003 | Rai et al. | ..................... 370/466 |
| 6,664,982 | B1 | * | 12/2003 | Bi | ............................. 715/773 |
| 6,732,177 | B1 | * | 5/2004 | Roy | .......................... 709/227 |
| 6,763,007 | B1 | * | 7/2004 | La Porta et al. | ............ 370/331 |

FOREIGN PATENT DOCUMENTS

EP 0 710 043 A1 5/1996

OTHER PUBLICATIONS

Jain, R., et al., *Mobile Internet Access and QoS Guarantees Using Mobile IP and RSVP with Location Registers*, 1998 IEEE, Jun. 1998, pp. 1690-1695.

* cited by examiner

Primary Examiner—John Pezzlo
(74) Attorney, Agent, or Firm—Bell, Boyd & Lloyd LLC

(57) ABSTRACT

An information processing device, method thereof and recording medium for communication regardless of the status of the terminal device. A domain name server stores the node identifier, and address for one or more mapping agents 121 corresponding to the host name of a terminal device. The domain name server receives a transmit request for the node identifier of terminal device 11 and the address of the mapping agent, sent from a terminal device, along with the host name or node identifier of terminal device 11. The domain name server 144 selects the node identifier for terminal device and address for mapping agent when the transmit request is received. The domain name server sends the node identifier for terminal device 11 and address for mapping agent to the terminal device.

10 Claims, 40 Drawing Sheets

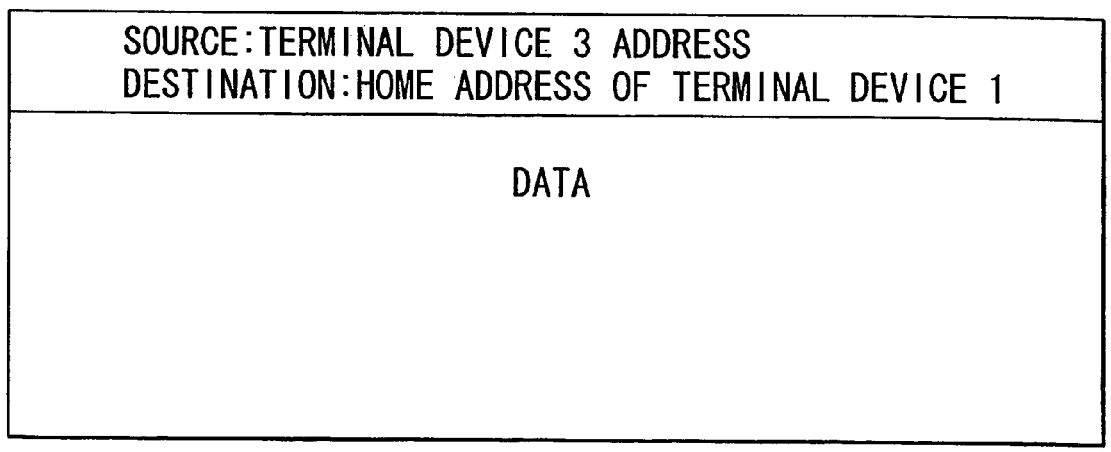

FIG. 22

| HOST NAME | NODE IDENTIFIER | HOME POSITION INDICATOR |
|---|---|---|
| aaaa | $\alpha\,\alpha\,\alpha\,\alpha$ | a1a1a1a1 |
| bbbb | $\beta\,\beta\,\beta\,\beta$ | b1b1b1b1 |
| cccc | $\gamma\,\gamma\,\gamma\,\gamma$ | c1c1c1c1 |
| ⋮ | ⋮ | ⋮ |

FIG. 23

| SOURCE: TERMINAL DEVICE 13 ADDRESS<br>DESTINATION: HOME POSITION INDICATOR+NODE<br>              IDENTIFIER OF TERMINAL DEVICE 11 |
|---|
| DATA |

FIG. 31

| HOST NAME | NODE IDENTIFIER | MAPPING AGENT ADDRESS |
|---|---|---|
| aaaa | ααα | iiii, jjjj, kkkk |
| bbbb | βββ | mmmm |
| cccc | γγγ | nnnn, oooo |
| --- | --- | --- |

FIG. 32

| NODE IDENTIFIER | CURRENT POSITION INDICATOR |
|---|---|
| α α α α | e1 e1 e1 e1 |

FIG. 33

| |
|---|
| SOURCE: TERMINAL DEVICE 13 ADDRESS<br>DESTINATION: POSITION INDICATOR+NODE<br>IDENTIFIER OF TERMINAL DEVICE 11 |
| DATA |

FIG. 34

| |
|---|
| SOURCE: POSITION INDICATOR+NODE IDENTIFIER OF TERMINAL DEVICE 11<br>DESTINATION: TERMINAL DEVICE 13 ADDRESS |
| DATA |

FIG. 38

```
SOURCE:TERMINAL DEVICE 13 ADDRESS
DESTINATION:NEW POSITION INDICATOR+NODE
            IDENTIFIER OF TERMINAL DEVICE 11

DATA
```

FIG. 39

```
SOURCE:TERMINAL DEVICE 13 ADDRESS
DESTINATION:OLD POSITION INDICATOR+NODE
            IDENTIFIER OF TERMINAL DEVICE 11

DATA
```

FIG. 41

| NODE IDENTIFIER | NEW POSITION INDICATOR | OLD POSITION INDICATOR | TIME | EFFECTIVE TIME |
|---|---|---|---|---|
| α α α α | e1e1e1e1 | h1h1h1h1 | 10:14 | 20 |
| β β β β | f1f1f1f1 | i1i1i1i1 | 10:31 | 30 |
| γ γ γ γ | g1g1g1g1 | j1j1j1j1 | 11:03 | 60 |
| ---- | ---- | ---- | ---- | ---- |

INFORMATION PROCESSING DEVICE, METHOD THEREOF, AND RECORDING MEDIUM

BACKGROUND OF THE INVENTION

1. Field of the Invention

This invention relates to an information processing device, method thereof, and recording medium, and relates in particular to an information processing device, method thereof, and recording medium to provide information relating to moving or movement of the position for connecting on the network.

2. Description of the Related Art

Along with the spread of portable personal computers in recent years, personal computer users are now able to carry these personal computers around. Further, rather than just carrying these portable personal computers, users can also connect them to a network at their destination and receive services by way of the network.

In this kind of so-called mobile computing environment, a prerequisite for connecting the device (personal computer) to a network to receive services is that the node has mobility. This kind of node must be able to continue communication even if the node position changes.

Currently, Mobile IPv6 has been proposed as a method for node communication in an IPv6 mobile computing environment, based on IPv6 (Internet Protocol version 6) standards.

The node in Mobile IPv6 has two IP addresses respectively called the home address and the Care-of-Address. The Care-of-Address changes along with the movement of the node, according to the currently connected subnetwork. The home address is fixed regardless of node movement. The other node being communicated (or mating node) with, can communicate with the moving node regardless of the moving node position (currently connected subnetwork), by specifying the home address of the moving node.

The home agent is the node connected to the subnetwork for the node home address. When the node has moved, a binding update packet containing a new care-of-address is received from the node that moved, and the binding cache storing the home address and matching care-of-address is rewritten. The home agent notifies the network of the path information for the home address of the node that moved.

A drawing illustrating the procedure for registering the care-of-address is shown in FIG. 1. When the node constituted by terminal device 1 has moved, the terminal device 1 acquires the care-of-address from the subnetwork at the destination. The terminal device 1 issues a binding update packet containing authentication data for terminal device 1, a home address, and care-of-address and sends the binding update packet to the home agent 2.

A drawing describing the format of the IPv6 header for IPv6 packet is shown in FIG. 2. A four byte protocol version, an eight byte traffic class for identifying and grouping the priority, and a twenty bit flow label for identifying the packet requesting execution of a special operation by router are placed inside the IPv6 header. The source address constituting the address of the node that sent the packet, the destination address constituting the address of the node that received the packet, and an optional extension header are also placed inside the IPv6 header.

The IPv6 packet is hereafter referred to simply as a packet.

A drawing of the IPv6 packet format is shown in FIG. 3. The upper 64 bits of the IPv6 address are path information, and the lower 64 bits are interface identifiers for identifying the node network interface, within the subnetwork connected to the node. The interface identifiers signify a presence within the subnetwork, and addresses such as MAC addresses are used as interface identifiers. The IPv6 address is hereafter referred to simply as an address.

A drawing of the binding update packet of the related art is shown in FIG. 4. The care-of-address for terminal device 1 is set in the source address of the IPv6 header, and the home agent address is set in the destination address.

The home address of the terminal device 1 and data showing that this packet is updated are stored inside the extension header as the destination header.

A drawing describing the authentication header is shown in FIG. 5. An SPI (Security Parameters Index), sequence number and authentication data are contained in the authentication header. A home agent 2 determines items such as the authentication key and encryption formula by checking the SA (Security Association) based on the destination address and authentication header of the SPI as shown in FIG. 6.

The home agent 2 checks whether or not the authentication data (variable) is correct when the binding update packet is received. If the authentication data (variable) is determined to be correct, then the care-of-address contained in the binding update packet received in the binding cache is registered. The home agent 2 transmits a response packet to the terminal device 1.

Next, the procedure of the related art for sending a packet to terminal device 1 from a moving terminal device 3 is explained while referring to FIG. 7. The terminal device 3 inquires about the home address of terminal device 1 to the domain name server indicating the host name of terminal device 1. The domain name server 4 has stored the host name and home address match as shown in FIG. 8, so that the host address of terminal device 1 is searched for based on the host name and a reply made to the terminal device 3. The terminal device 3 generates and transmits a packet as shown in FIG. 9, having the home address of terminal device 1 set in the destination address.

The packet sent by the terminal device 3 arrives at the home agent 2 by the information path reported by home agent 2. As shown in FIG. 10, the home agent 2 further attaches an IPv6 header set with the care-of-address of terminal device 1 in the destination address to the receive packet, and transmits this packet. This packet arrives at terminal device 1 by the usual path management. The terminal device 1 removes from the received packet, the IPv6 header that was added by the home agent 2, and acquires the original packet.

The terminal device 1 generates a binding update packet containing the care-of-address of the terminal device 1 and the authentication header, and sends this binding update packet to the terminal device 3. Upon receiving the binding update packet, the terminal device 3 checks the authentication data and if the check shows the authentication data to be correct, the care-of-address of terminal device 1 is registered in the binding cache. The terminal device 3 transmits an acknowledge response packet to the terminal device 1.

The packet sent to the terminal device 3 from the terminal device 1, is set with a care-of-address for terminal device 1 as the source address as shown in FIG. 11, and the home address is stored in the destination options header of the extension header. This packet arrives in terminal device 3 by an optimal path.

After the binding update packet is received, as shown in FIG. 3, a routing header is attached to the packet the terminal device 3 transmits to the terminal device 1, and the packet arrives at the terminal device 1 by an optimal path.

When the terminal device 1 moves while in this status, the terminal device 1 transmits a new care-of-address to the terminal device 3 and the home agent 2. The terminal device 3 holds the matching home address of terminal device 1 and care-of-address as a binding cache. The terminal device 1 periodically transmits a binding update packet to the home agent 2 and the terminal device 3, and updates the binding cache in the terminal device 3.

The operation when the terminal device 1 has moved is described while referring to FIG. 13. The terminal device 1 acquires the care-of-address from the subnetwork at the (movement) destination. The terminal device 1 generates a binding update packet containing the home address of terminal device 1 shown in FIG. 14, and transmits this binding update packet to the terminal device 13. Upon receiving the binding update packet, the terminal device 3 checks whether or not the authentication data stored in the binding update packet is correct, and when the authentication data is determined to be correct, the care-of-address for the terminal device 1 stored in the binding update packet, is registered in the binding cache. The terminal device 3 returns the acknowledge response packet to the terminal device 1.

The terminal device 1 generates a binding update packet containing the home address of the terminal device 1 shown in FIG. 15, and transmits this binding update packet to the home agent 2. On receiving the binding update packet, the home agent 2 checks whether or not the authentication data stored in the binding update packet is correct, and when the authentication data is determined to be correct, the care-of-address for the terminal device 1 stored in the binding update packet, is registered in the binding cache. The home agent 2 returns the acknowledge response packet to the terminal device 1.

However, the related art is limited because a home agent 2 must be installed in the subnetwork for the home address of terminal device 1.

When the terminal device 3 does not hold the care-of-address for terminal device 1 as a binding cache, and a firewall is provided between the home agent 2 and terminal device 3, packets cannot be sent from terminal device 3 to terminal device 1.

In the same way, when a firewall is installed between the terminal device 1 and the home agent 2, the terminal device 1 cannot register the care-of-address in the home agent 2.

Further, when the home agent 2 is defective, or the link between the terminal device 1 and the home agent 2 is defective, the terminal device 1 cannot register the new care-of-address in the home agent 1.

When the terminal device 1 has moved, in the time interval until the binding cache of terminal 3 has been rewritten, the terminal device 3 transmits the packet with the care-of-address used prior to movement of the terminal device 1 so that the packet using the care-of-address prior to movement of terminal device 1, does not arrive at terminal device 1 and is lost.

When the terminal device 1 is positioned at the boundary of two wireless subnetworks, fluctuations occur in the radio wave intensity of the wireless subnetwork so that the terminal device 1 appears to be moving repeatedly back and forth between the two wireless subnetworks and a drastic increase in lost packets occurs.

SUMMARY OF THE INVENTION

In view of the above problems with the related art, this invention has the goal of eliminating limitations due to the installation of the home agent, and allow communication regardless of the terminal device status.

According to one aspect of the present invention, the information processing device comprises a storage means for storing a first data for designating a first terminal device corresponding to the host name of the first terminal device, as well as a third data showing the position of one or more provision devices for providing a second data showing the current position of the first terminal device; a receive means to receive a transmit request for the first data and the third data corresponding to the first terminal device, sent along with the host name of the first terminal device from the second terminal device; a selection means to select a first data corresponding to the first terminal device stored in the storage means and to select a third data showing the position of one more provision devices when the transmit request is received from the receive means; and a transmit means to transmit the first data and third data selected by the selection means, to the second terminal device.

According to another aspect of the present invention, an information processing method for storing a first data for designating a first terminal device corresponding to the host name of the first terminal device, as well as for storing a third data showing the position of one or more provision devices for providing a second data showing the current position of the first terminal device comprises a receive step to receive a transmit request for the third data and the first data corresponding to the first terminal device, transmitted along with the host name of the first terminal device from the second terminal device; a selection step to select a first data corresponding to the first terminal device stored in the storage means and to select a third data showing the position of one more provision devices, when the transmit request is received from the receive means; and a transmit step to transmit the first data and third data selected by the selection means, to the second terminal device.

According to another aspect of the present invention, an information processing program for a recording medium for storing a first data for designating a first terminal device corresponding to the host name of the first terminal device, as well as for storing a third data showing the position of one or more provision devices for providing a second data showing the current position of the first terminal device, comprises a receive step to receive a transmit request for the third data and the first data corresponding to the first terminal device, transmitted along with the host name of the first terminal device from the second terminal device and; a selection step to select a first data corresponding to the first terminal device stored in the storage means and to select a third data showing the position of one more provision devices when the transmit request is received from the receive means and; a transmit step to transmit the first data and third data selected by the selection means, to the second terminal device.

According to another aspect of the present invention, an information processing device comprises a first transmit means for transmitting a transmit request for a second data showing the position of one or more first provision devices, as well as a first data designating a terminal device, to a second provision device along with the name of the terminal device and, a first receive means to receive a second data showing the position of one or more first provision devices as well as the first data for designating the terminal device from the second terminal device and, a second transmit means for transmitting a transmit request for a third data designating the position of the terminal device, along with a first data designating the terminal device, to any of the one or more first provision devices and, a second receive means for receiving a third data designating the position of the terminal device from any of the one or more first provision devices.

According to another aspect of the present invention, an information processing method comprises a first transmit step to transmit a request for a second data showing the position of one or more first provision devices, as well as a first data designating a terminal device, to a second provision device along with the name of the terminal device and, a first receive step to receive a second data showing the position of one or more first provision devices as well as first data for designating the terminal device from the second terminal device and, a second transmit step for transmitting a request for transmission of a third data designating the position of the terminal device, along with a first data designating the terminal device, to any of the one or more first provision devices and, a second receive step for receiving the third data designating the position of the terminal device from any of the one or more first provision devices.

According to another aspect of the present invention, a program for a recording medium comprises a first transmit step to transmit a request for a second data showing the position of one or more first provision devices, as well as a first data designating a terminal device, to a second provision device along with the name of the terminal device and, a first receive step to receive a second data showing the position of one or more first provision devices as well as the first data for designating the terminal device from the second terminal device and, a second transmit step for transmitting a request for transmission of a third data designating the position of the terminal device, along with a first data designating the terminal device, to any of the one or more first provision devices and, a second receive step for receiving the third data designating the position of the terminal device from any of the one or more first provision devices.

According to another aspect of the present invention, an information processing device comprises a transmit means to transmit to the other communication party, a first data for designating the current position of the information processing device itself, along with a second data for designating the position prior to movement.

According to another aspect of the present invention, an information processing device further comprises second transmit means for transmitting to a second communication party, a third data for designating its own movement of the information processing device.

According to another aspect of the present invention, an information processing method comprises a transmit step to transmit to the other communication party, a first data for designating the current position of the information processing device itself, along with a second data for designating the position prior to movement.

According to another aspect of the present invention, a program for a recording medium comprises a transmit step to transmit to the other communication party, a first data for designating the current position of the information processing device itself, along with a second data for designating the position prior to movement.

According to another aspect of the present invention, an information processing device comprises first receive means for receiving a first data designating a terminal device and a second data showing movement from the terminal device; first transmit means for transmitting a request for transmission of a third data showing the position of one or more first provision devices along with the name of the terminal device to a second provision device; second receive means for receiving the third data showing the position of the one or more first provision devices from said second provision device; second transmit means for transmitting a request for transmission of a fourth data designating the position of the terminal device, along with the first data designating the terminal device, to any of the one or more first provision devices; and third receive means for receiving the fourth data designating the position of the terminal device from any of the one or more first provision devices.

According to another aspect of the present invention, there is provided an information processing device, in which the first receive means receives the first data and the second data based on connectionless-mode protocol.

According to another aspect of the present invention, an information processing method comprises first receive step of receiving a first data designating a terminal device and a second data showing movement from the terminal device; first transmit step of transmitting a request for transmission of a third data showing the position of one or more first provision devices along with the name of the terminal device to a second provision device; second receive step of receiving the third data showing the position of the one or more first provision devices from the second provision device; second transmit step of transmitting a request for transmission of a fourth data designating the position of the terminal device, along with the first data designating said terminal device, to any of the one or more first provision devices; and third receive step of receiving the fourth data designating the position of the terminal device from any of the one or more first provision devices.

According to another aspect of the present invention, there is provided a recording medium recorded with a computer-loadable information processing program, in which said computer-loadable information processing program comprises first receive step of receiving a first data designating a terminal device and a second data showing movement from the terminal device; first transmit step of transmitting a request for transmission of a third data showing the position of one or more first provision devices along with the name of the terminal device to a second provision device; second receive step of receiving the third data showing the position of the one or more first provision devices from the second provision device; second transmit step of transmitting a request for transmission of a fourth data designating the position of the terminal device, along with the first data designating said terminal device, to any of the one or more first provision devices; and third receive step of receiving said fourth data designating the position of the terminal device from any of the one or more first provision devices.

According to one aspect of the present invention, in an information processing device, an information processing method, and a recording medium, a transmit request for a first data and a third data corresponding to the first terminal device are transmitted from a second terminal device along with the host for the first terminal device. When the transmit request is received, the first data corresponding to the first terminal device, as well as a third data showing the position of one or more provision devices are selected. The selected first data and third data are transmitted to a second terminal device.

According to one aspect of the present invention, in an information processing device, an information processing method, and a recording medium, a request for transmitting a second data showing the position of one or more provision devices and a first data designating the terminal device are transmitted to the second terminal device along with the name of the terminal device. The first data designating the terminal device and the second data showing the position of one or more provision devices are received from the second terminal device. A request for transmission of a third data designating the position of the terminal device is transmitted along with the first data designating the terminal device to any of the first provision devices. A third data designating the position of the terminal device from among any of the first provision devices is received.

According to one aspect of the present invention, in an information processing device, an information processing method, and a recording medium, a first data designating the current self-position is transmitted along with a second data designating the position before movement, to the other communication party.

According to one aspect of the present invention, in an information processing device, an information processing method, and a recording medium, a first data designating a terminal device and a second data showing movement said terminal device are received; a request for transmission of a third data showing the position of one or more first provision devices is transmitted, along with the name of said terminal device, to a second provision device; the third data showing the position of the one or more first provision devices is received from the second provision device; a request for transmission of a fourth data designating the position of the terminal device is transmitted, along with the first data designating the terminal device, to any of the one or more first provision devices; and the fourth data designating the position of the terminal device is received from any of the one or more first provision devices.

BRIEF DESCRIPTION OF THE DRAWINGS

FIG. 8 is a table for showing the corresponding home address and the host name stored in the domain name server 4.

FIG. 9 is a drawing showing the packet sent by the terminal device 3.

FIG. 22 is a table showing the host name, home position indicator and node identifier stored by the domain name server 14.

FIG. 23 is a drawing showing the packet transmitted by the terminal device 13.

FIG. 31 is a table showing the host name, node identifier and mapping agent address stored by the domain name server 222.

FIG. 32 is a drawing showing the corresponding node identifier and current position indicator stored by the terminal device 13.

FIG. 33 is a drawing showing the packet the terminal device 13 transmits to the terminal device 11.

FIG. 34 is a drawing showing the packet the terminal device 11 transmits to the terminal device 13.

FIG. 38 is a drawing showing the packet the terminal device 13 transmits to the terminal device 11.

FIG. 39 is a drawing showing the packet the terminal device 13 transmits to the terminal device 11.

FIG. 41 is a table illustrating the router mapping cache.

DESCRIPTION OF THE PREFERRED EMBODIMENTS

Figure 16:
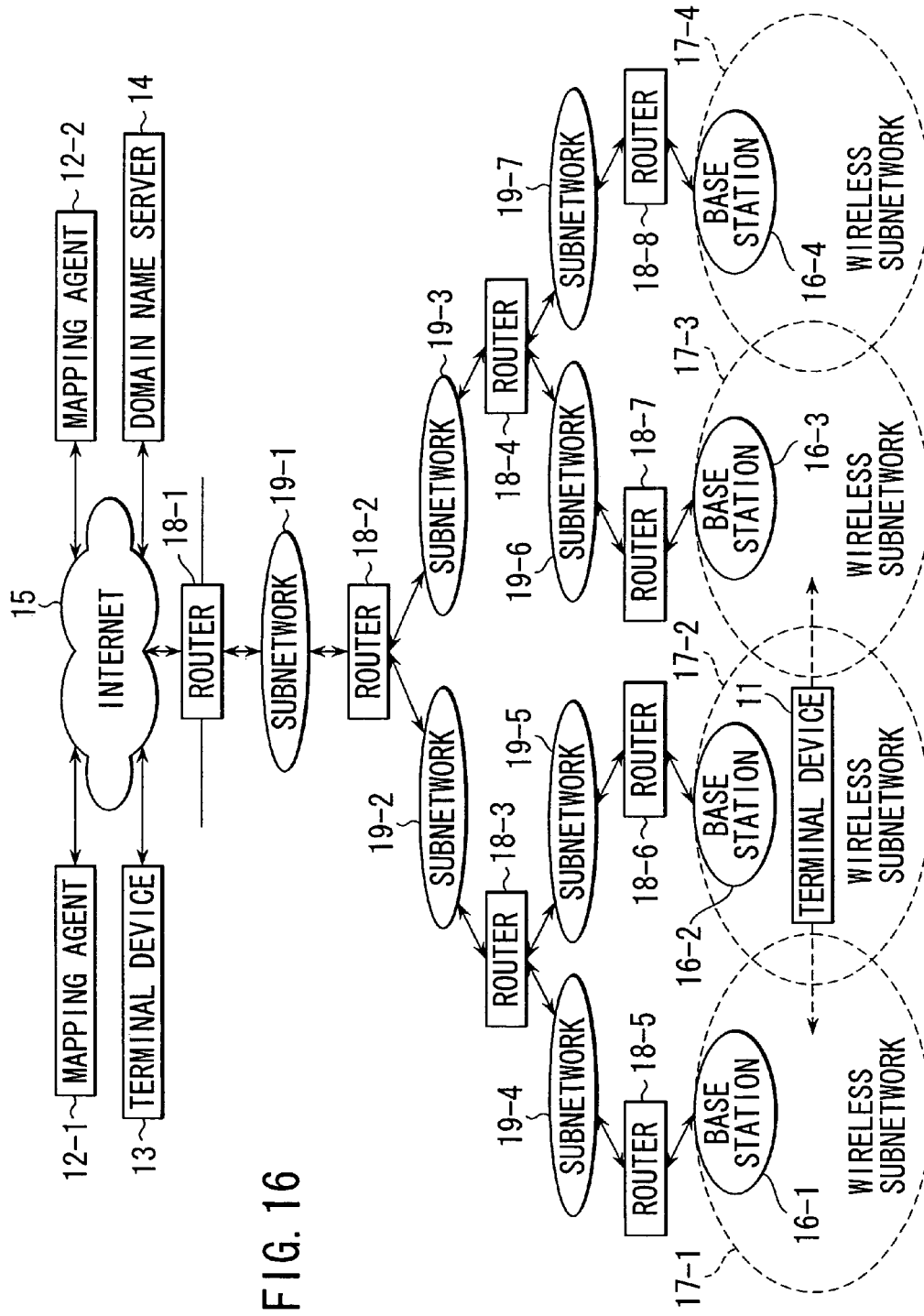
FIG. 16 is a drawing showing the embodiment of the network system of this invention.

A drawing of the embodiment of the network system of this invention is shown in FIG. 16. In the network system shown in FIG. 16, the nodes comprising the network communicate based on the LIN6 address as well as LIN6.

Figure 17:
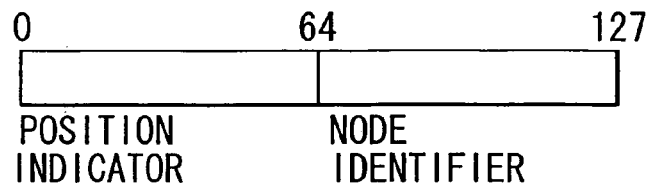
FIG. 17 is a drawing describing the LIN6 address.

The LIN6 address consists of 128 bits as shown in FIG. 17 and is comprised of a node identifier (lower 64 bits) for identifying the nodes on the Internet 15, and position indicators (upper 64 bits) showing nodes connected to any of the subnetworks, 19-1 through 19-7 as well as the wireless networks 17-1 through 17-4.

The node identifier is for identifying the node itself such as for the terminal device 11. The node identifier is utilized in recognizing or authenticating the node and its value does not change with the node position or movement. The position indicator is utilized for transmitting packets to nodes connected to any of the subnetworks 19-1 through 19-7 and wireless networks 17-1 through 17-4.

The upper 64 bits of the LIN6 address perform the same role as the upper 64 bits of the IPv6 address proposed by the IETF (Internet Engineering Task Force). The path control mechanism in the IP layer can therefore be utilized as is.

LIN6 is a network architecture based on the LIN6 address, provided for verifying continuous node movement and movement permeability regardless of the mutual node position or movement in communication between nodes. LIN6 therefore not only utilizes LIN6 address as the IPv6 address but also has a VIP function for verifying node movement and node permeability.

Figure 18:
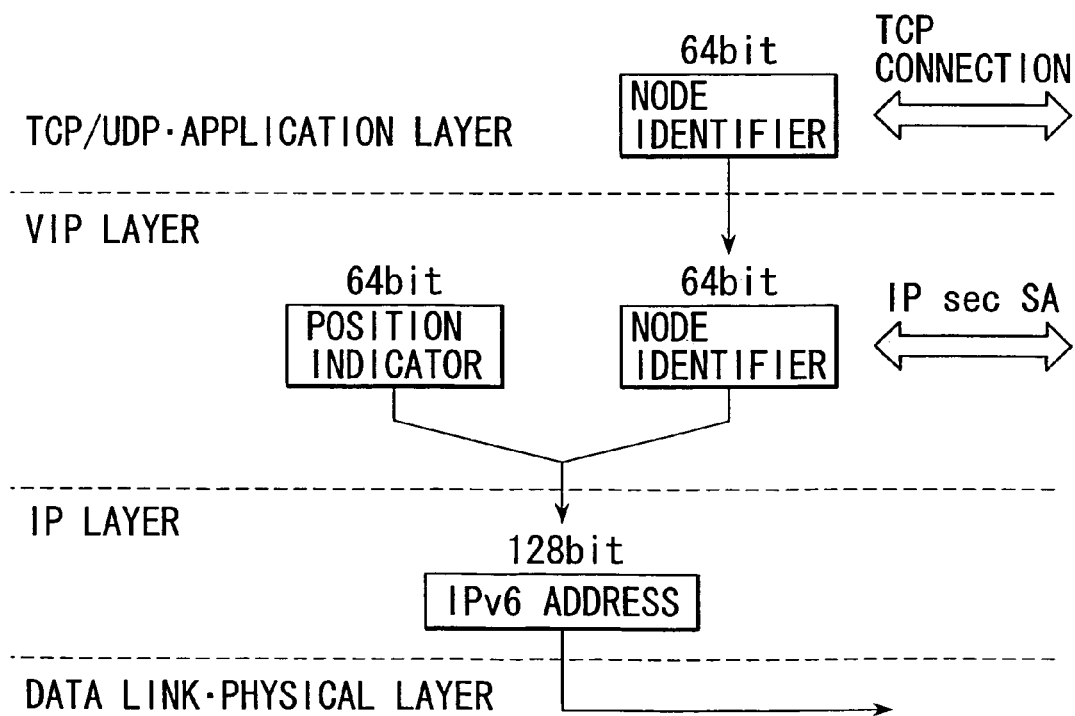
FIG. 18 is a drawing showing the configuration of the protocol layer in LIN6.

A diagram showing the protocol structure in LIN6 is shown in FIG. 18. The protocol layer in LIN6 is comprised of an application layer, TCP/UDP layer, VIP layer, IP layer, data link layer and a physical layer.

Nodes are identified in the application layer and the TCP/UDP layer by utilizing the node identifier located in the lower 64 bits of the LIN6 address. A position indicator is linked to a matching node identifier in the VIP layer inserted between the TCP/UDP layer and the IP layer, and a 128-bit LIN6 address is generated.

Transmission of packets is performed in the IP layer based on the LIN6 address generated in the VIP layer.

When a packet is received on the other hand, the position indicator is removed from the LIN6 address, and only the node identifier is delivered to the application layer and TCP/UDP layer.

Returning to FIG. 16, when positioned within the wireless subnetwork 17-1 of base station 16-1, the terminal device 11 communicates by radio (wireless) with the base station 16-1, and connects to the Internet 15 by way of the router 185, the subnetwork 19-4, the router 18-3, the subnetwork 19-2, the router 18-2, the subnetwork 19-1, and the router 18-1.

When positioned within the wireless subnetwork 17-2 of base station 16-2, the terminal device 11 communicates by radio (wireless) with the base station 16-2, and connects to the Internet 15 by way of the router 18-6, the subnetwork 19-5, the router 18-3, the subnetwork 19-2, the router 18-2, the subnetwork 19-1, and the router 18-1.

When positioned within the wireless subnetwork 17-3 of base station 16-3, the terminal device 11 communicates by radio (wireless) with the base station 16-3, and connects to the Internet 15 by way of the router 18-7, the subnetwork 19-6, the router 18-4, the subnetwork 19-3, the router 18-2, the subnetwork 19-1, and the router 18-1.

When positioned within the wireless subnetwork 17-4 of base station 16-4, the terminal device 11 communicates by radio (wireless) with the base station 16-4, and connects to the Internet 15 by way of the router 18-8, the subnetwork 19-7, the router 18-4, the subnetwork 19-3, the router 18-2, the subnetwork 19-1, and the router 18-1.

The mapping agent 12-1 stores the corresponding node identifier and position indicator for the terminal device 11. The mapping agent 12-2 stores the corresponding node identifier and position indicator for the terminal device 11.

A terminal device 13 is connected to the Internet 15, and communicates with the terminal device 11 by way of the Internet 15, etc.

The domain name server 14 stores the node identifier and position indicator, or the node identifier, and mapping agents 12-1 and 12-2 addresses corresponding to the host name. The home position indicator serves as a position indicator for either the subnetwork 19-1 through 19-7 normally connected to the terminal device 11 or the subnetworks not shown in the drawing. The current position indicator in contrast, serves as a position indicator for any of the corresponding wireless subnetworks 17-1 through 17-4 currently connected to the terminal device 11.

The base station 16-1 forms a wireless subnetwork 17-1, communicates by wireless (radio) with the terminal device 11 positioned within the wireless subnetwork 17-1, and receives the packet sent by the terminal device 11. The received packet is supplied to the router 18-5, and a packet for the terminal device 11 input from the router 18-5 is sent to the terminal device 11.

The base station 16-1 supplies a position indicator corresponding to the wireless subnetwork 17-1, to the terminal device 11 positioned within the wireless subnetwork 17-1.

The base station 16-2 forms a wireless subnetwork 17-2, communicates by wireless (radio) with the terminal device 11 positioned within the wireless subnetwork 17-2, and receives the packet sent by the terminal device 11. The received packet is supplied to the router 18-6, and a packet for the terminal device 11 input from the router 18-6 is sent to the terminal device 11.

The base station 16-2 supplies a position indicator corresponding to the wireless subnetwork 17-2, to the terminal device 11 positioned within the wireless subnetwork 17-2.

The base station 16-3 forms a wireless subnetwork 17-3, communicates by wireless (radio) with the terminal device 11 positioned within the wireless subnetwork 17-3, and receives the packet sent by the terminal device 11. The received packet is supplied to the router 18-7, and a packet for the terminal device 11 input from the router 18-7 is sent to the terminal device 11.

The base station 16-3 supplies a position indicator corresponding to the wireless subnetwork 17-3, to the terminal device 11 positioned within the wireless subnetwork 17-3.

The base station 16-4 forms a wireless subnetwork 17-4, communicates by wireless (radio) with the terminal device 11 positioned within the wireless subnetwork 17-4, and receives the packet sent by the terminal device 11. The received packet is supplied to the router 18-8, and a packet for the terminal device 11 input from the router 18-8 is sent to the terminal device 11.

The base station 16-4 supplies a position indicator corresponding to the wireless subnetwork 17-4, to the terminal device 11 positioned within the wireless subnetwork 17-4.

The base stations 16-1 through 16-4 communicate with a plurality of terminal devices so the wireless subnetwork 17-1 through 17-4 form networks by way of wireless (radio).

The routers 18-1 through 18-8 respectively store position indicators corresponding to the node identifiers, and control the paths along which packets are supplied from the terminal device 11, terminal device 13, mapping agent 12-1 through 12-2 or the domain name server 14.

Hereafter, the mapping agents 12-1 and 12-2 shall be referred to simply as the mapping agent 12 when there is no need for their individual identification.

Hereafter, the base stations 16-1 through 16-4 shall be referred to simply as the base station 16 when there is no need for their individual identification. Hereafter, the wireless subnetworks 17-1 through 17-4 shall be referred to simply as the wireless subnetworks 17 when there is no need for their individual identification.

Hereafter, the routers 18-1 through 18-8 shall be referred to simply as the routers 16 when there is no need for their individual identification. Hereafter, the subnetworks 19-1 through 19-7 shall be referred to simply as the subnetworks 19 when there is no need for their individual identification.

Figure 19:
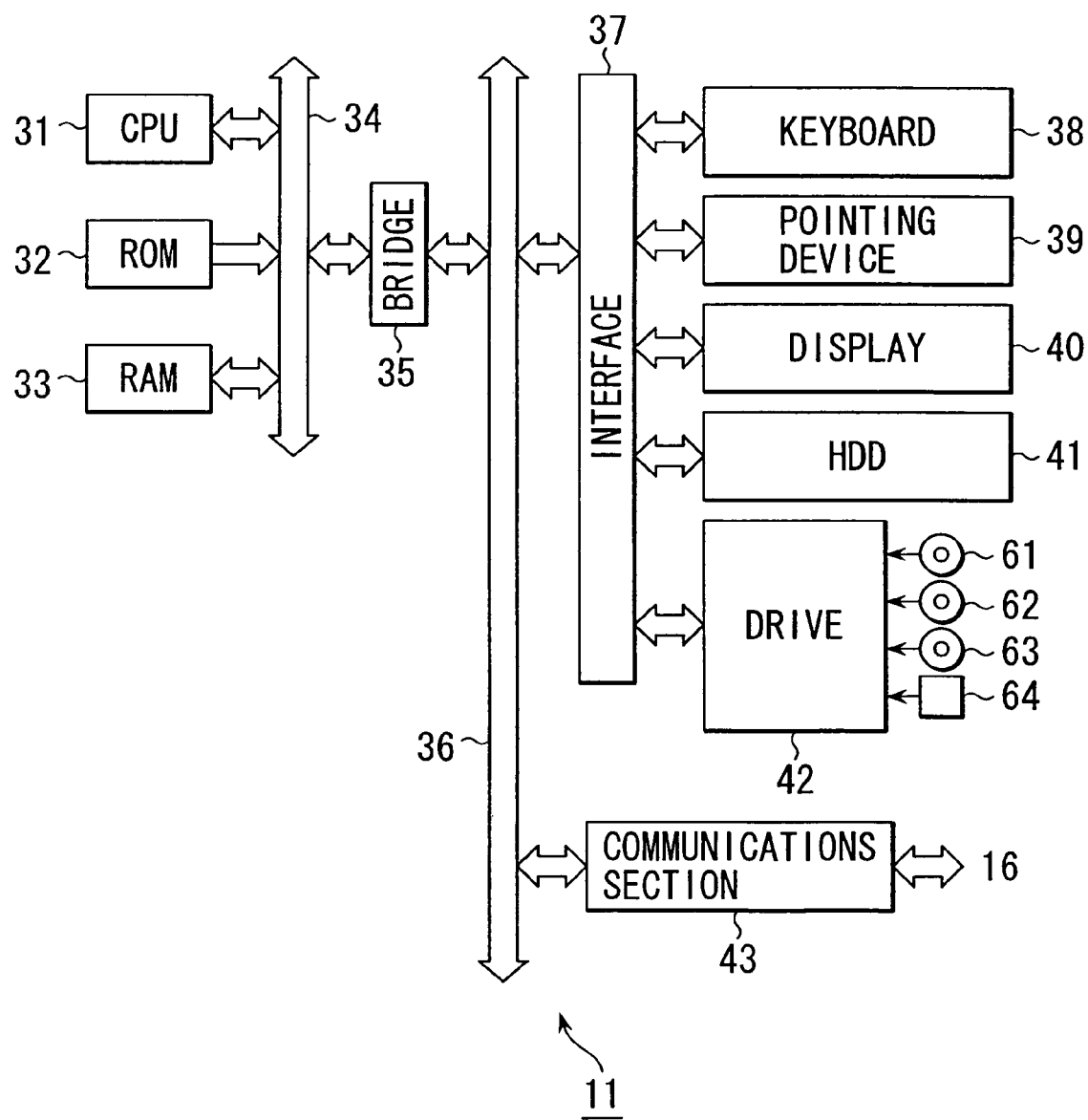
FIG. 19 is a drawing describing the structure of the terminal device 11.

A drawing of the structure of the terminal device 11 is shown in FIG. 19. ACPU (central processing unit) 31 operates the various application programs and the OS (operating system). An ROM (read-only memory) 32 generally stores the basic fixed data among the program and the processing parameters executed by the CPU31. An RAM (random access memory) 33 stores the programs used per execution by the CPU31 and the parameters that must be changed as needed to run those programs. These components are mutually connected by a host bus 323 comprised of a CPU bus, etc.

The host bus 34 is connected via a bridge 35 to an external bus 36 such as a PCI (peripheral component bus).

A keyboard 38 is operated by the user when various commands are input to the CPU31. A pointing device 39 is operated by the user, for making selections and commanding the pointer on the screen of a display 40. The display 40 is comprised for example of a liquid crystal device and displays all kinds of information as images and text. The HDD (hard disk drive) 41 drives a hard disk, and records or reproduces information and programs on the hard disk executed by the CPU31.

The drive 42 reads out (loads) programs (including programs run by the communications section 43) or data recorded on a magnetic disk 61, an optical disk 62, an optical magnetic disk 63 or a semiconductor memory 64 loaded in the driver 42. These data or programs are supplied to the RAM33 or the communications section 43 connected by way of the interface 37, external bus 36, bridge 35, and host bus 34. The keyboard 38 through drive 42 are connected to the interface 37. The interface 37 is connected to the CPU31 by way of the external bus 36, the bridge 35, and the host bus 34.

The communications section 43 communicates with the base station 16, and data supplied from the CPU31 or the HDD51, is stored in a packet of the specified type, and along with being transmitted to the base station 16, the data stored in the packet received from the base station 16 is output to the CPU31, RAM33, or the HDD41.

The communications section 43 is connected to the CPU31 by way of external bus 36, the bridge 35, and the host bus 34.

The mapping agents 12-1 and 12-2, the terminal device 13 and also the domain name server 14 have a structure identical to the terminal device 1 so an explanation is omitted.

Figure 20:
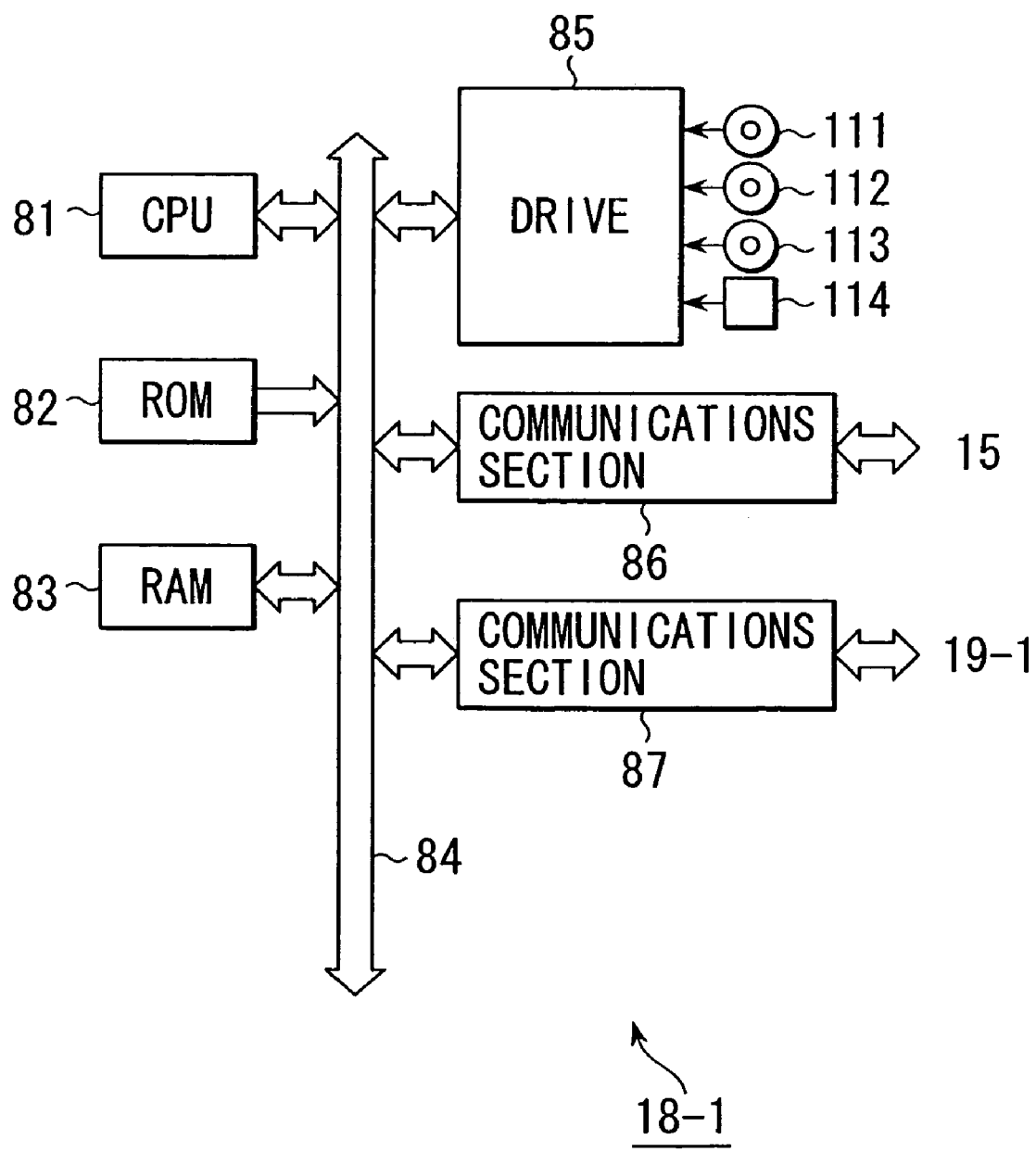
FIG. 20 is a drawing describing the structure of the router 18.

The structure of the router 18-1 is described using FIG. 20. A CPU81 performs actual execution of the specified program. The ROM82 generally stores the basic fixed data among the program and the processing parameters executed in the CPU81. An RAM (random access memory) 83 stores the programs used per execution by the CPU31 and the parameters that must be changed as needed to run those programs.

The drive 85 reads out (loads) programs (including programs run by the communications section 486 or communications section 87) or data recorded on a magnetic disk 111, an optical disk 112, an optical magnetic disk 113 or a semiconductor memory 114 loaded in the driver 85. These data or programs are supplied to the RAM83, the communications section 86 or the communications section 87 connected by way of the bus 84.

The communications section 86 is connected to the Internet 15 and the data supplied from the CPU81 or the communications section 87, is stored in a packet of the specified type, and besides being transmitted by way of the Internet 15, the data stored in the packets received by way of the Internet 15 are output to the CPU81 or the communications section 87.

The communications section 87 is connected to the subnetwork 19-1, and the data supplied from the CPU81 or the communications section 86 is stored in a packet of a specified type, and besides being transmitted by way of the subnetwork 19-1, the data stored in the packets received by way of the subnetwork 19-1 are output to the CPU81 or communications section 86.

The CPU81 through communications section 87 are mutually connected by way of the bus 84.

The structure of the routers 18-2 through 18-8 is identical to the router 18-1 so an explanation is omitted.

The first embodiment of the invention is described next.

Figure 21:
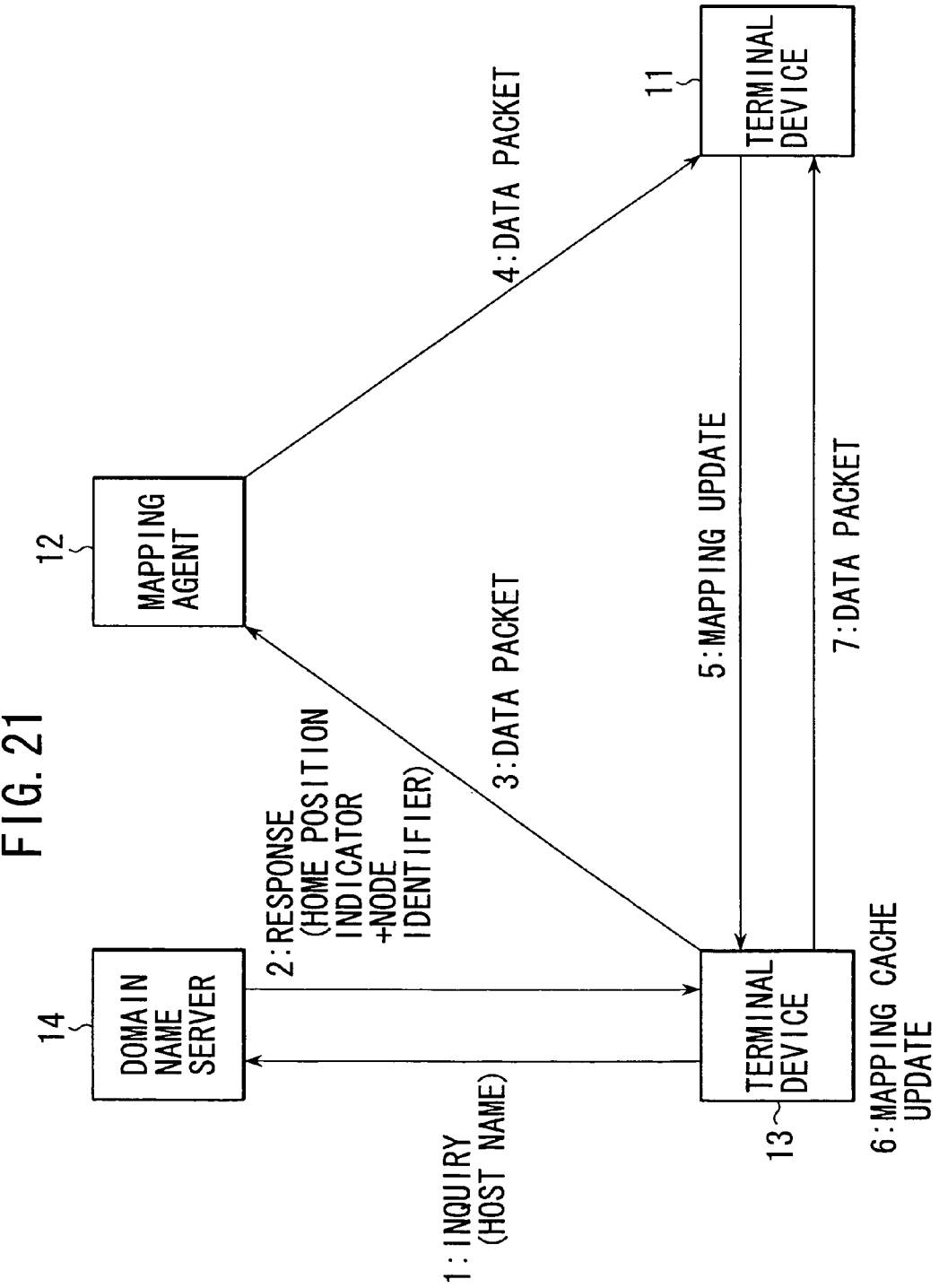
FIG. 21 is a drawing describing the procedure for transmitting a packet from the terminal device 13 to the moving terminal device 11 in the first embodiment.

The procedure for the terminal device 13 to transmit a packet to the moving terminal device 11 in the first embodiment is explained while referring to FIG. 21. The terminal device 13 indicates the host name of terminal device 11 via the Internet 15, and makes an inquiry to the domain name server 14 for the node identifier and home position indicator of terminal device 11. As shown in FIG. 22, the domain name server 14 stores the node identifier and home position indicator corresponding to the host name, and loads (reads out) the node identifier and home position indicator of terminal device 11, and transmits the node identifier and home position indicator of terminal device 11 that were loaded, to the terminal device 13.

The terminal device 13 sets the address linked with the node identifier and home position indicator of terminal device 11 into the destination address, and generates a packet as shown in FIG. 23 in which are set the address of terminal device 13 as the source address, and transmits this packet by way of the Internet 15.

Figure 24:
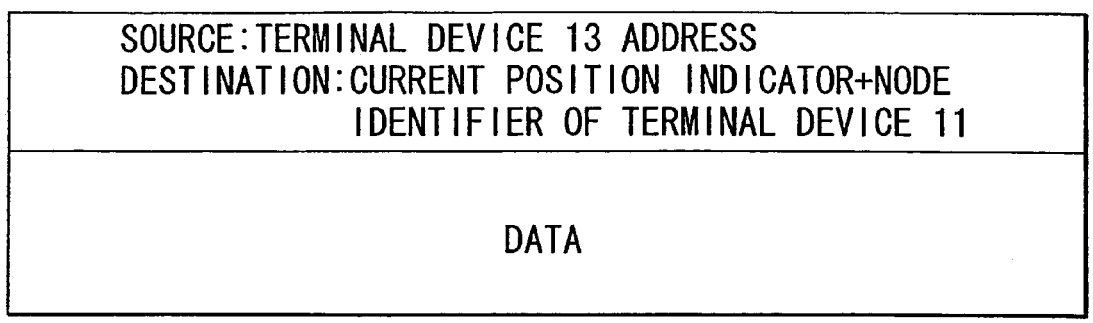
FIG. 24 is a drawing showing the packet transmitted by the terminal device 13.

The packet transmitted by the terminal device 13 arrives at the mapping agent 12 by means of the path information announced by the mapping agent 12. As shown in FIG. 24, the mapping agent 12 rewrites the home position indicator of the destination address of the packet that was sent, into the current position indicator of terminal device 11 and transmits it by the Internet 15. The packet transmitted by the mapping agent 12 in compliance with the usual path control, arrives at the terminal device 11 byway of the Internet 15, the routers 18-1 through 18-8 and the subnetworks 19-1 through 19-7.

Figure 25:
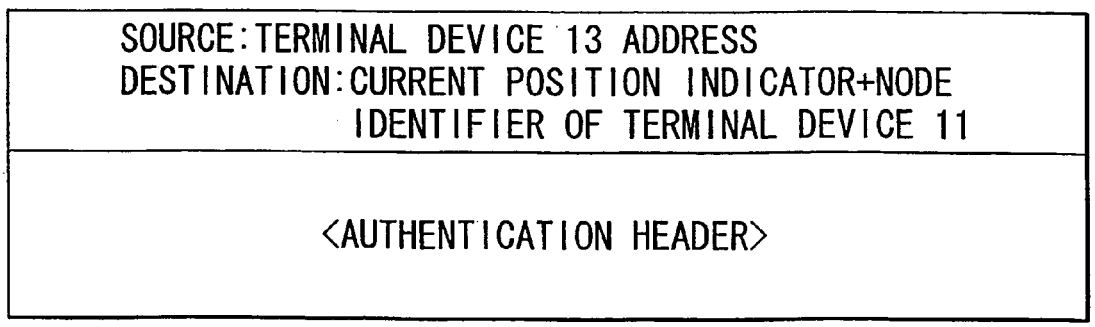
FIG. 25 is a drawing illustrating the concept of the authentication processing.
Figure 26:
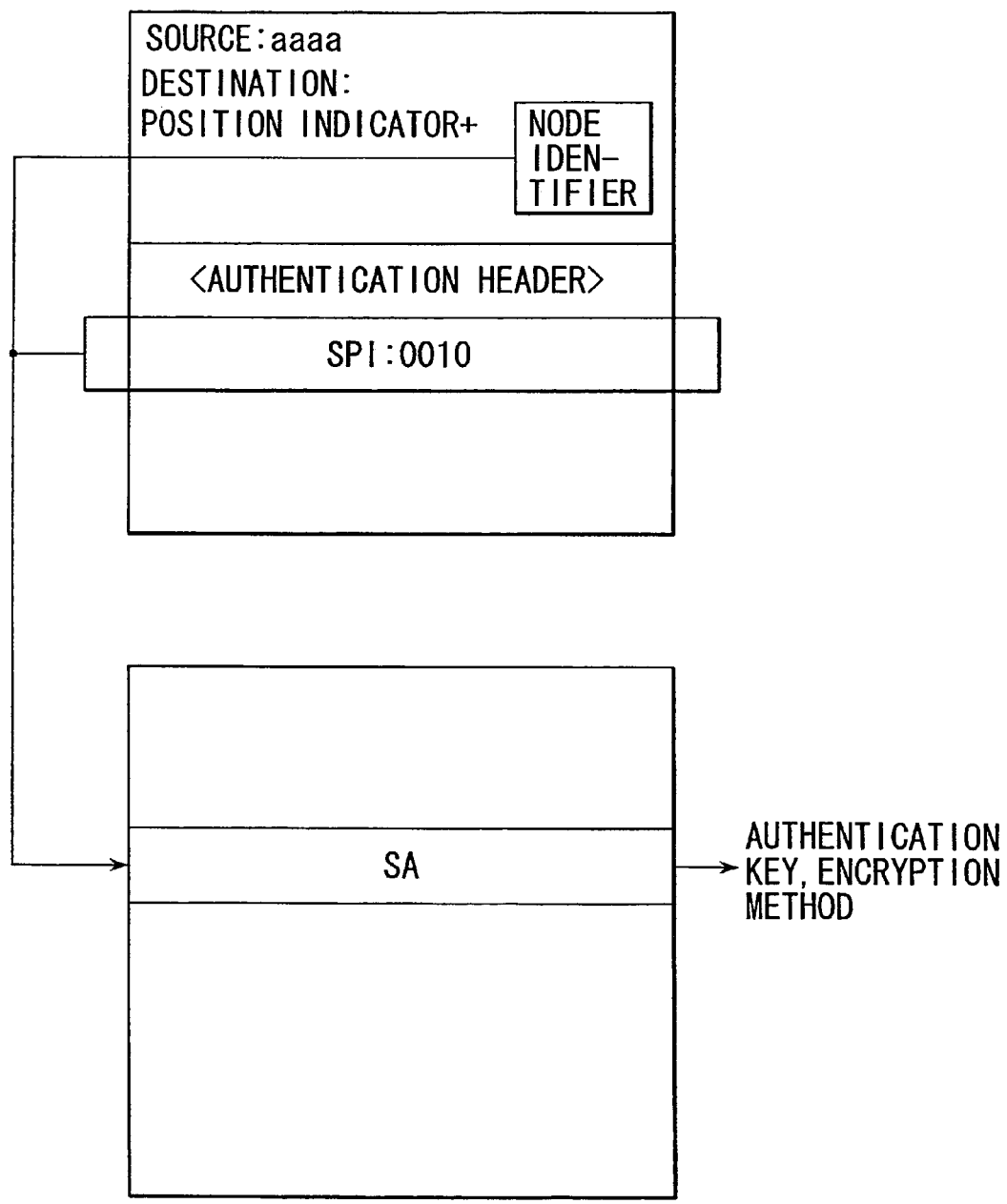
FIG. 26 is a drawing showing the process for transmitting a packet from the terminal device 13 to the terminal device 11 in the first embodiment.

As shown in FIG. 25, the terminal device 11 generates a mapping update packet containing an authentication header and a current position indicator for terminal device 11 in the destination address. The terminal device 11 transmits this binding update packet to the terminal device 13 by way of the Internet 15, router 18-1 through 18-8, and the subnetworks 19-1 through 19-7, and notifies the terminal device 13 of the current position indicator of terminal device 11. Upon receiving the mapping update packet, the terminal device 13 checks the SA based on the SPI authentication header and the node identifier for the destination address, establishes the authentication key or the encrypting method, and executes the authentication processing. When determined that the authentication data is correct, the terminal device 13 registers the current position indicator of the terminal device 11 stored in the mapping update packet, into the mapping cache.

After the above-described communication processing, the packet transmitted to the terminal device 11 from the terminal device 13, is set in the destination address, with the node identifier and the current position indicator of terminal device 11 so that the packet will arrive at the terminal device 11 by the optimum path.

Figure 27:
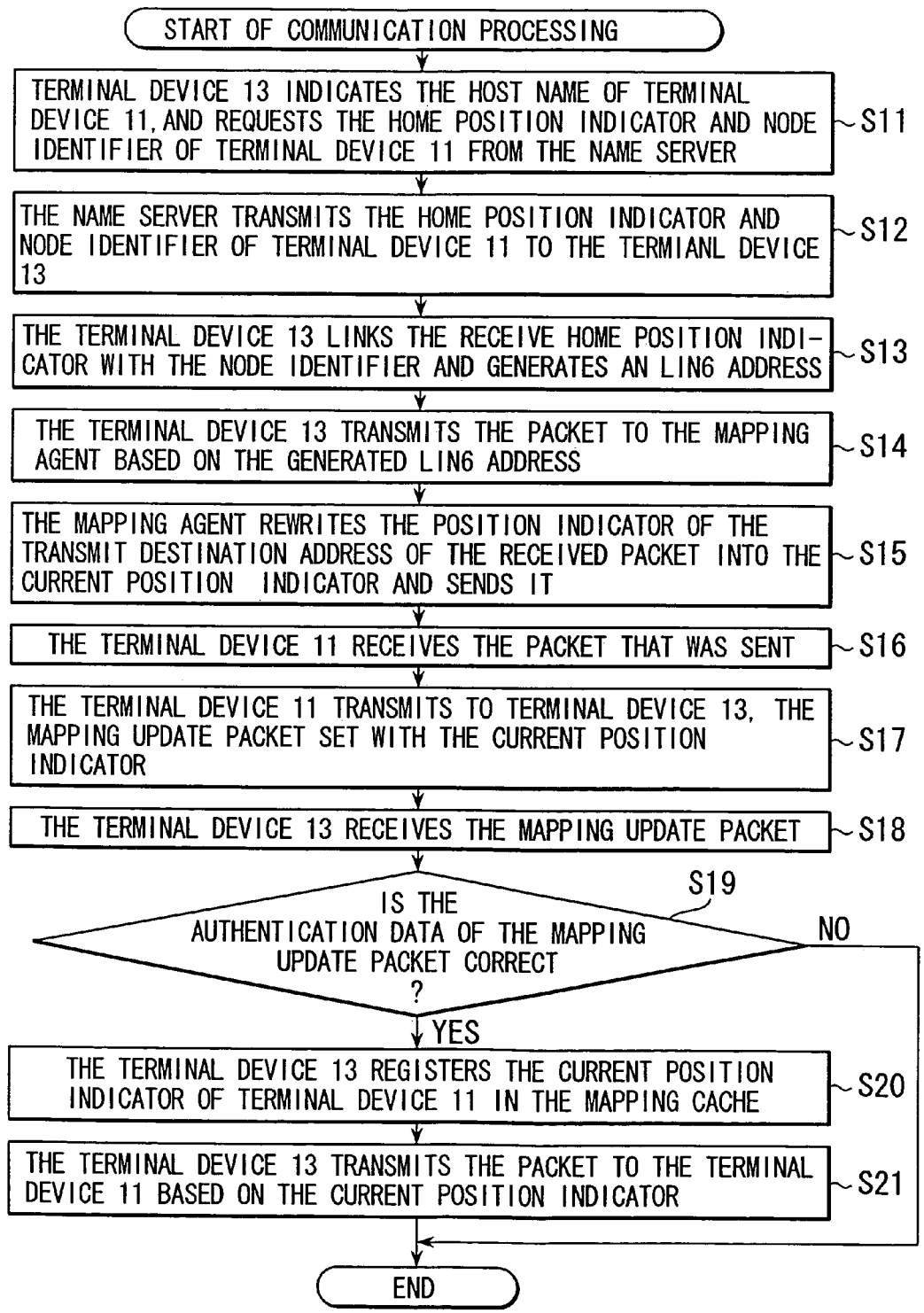
FIG. 27 is a drawing showing the process for transmitting a packet from the terminal device 13 to the terminal device 11 in the first embodiment.

The process in the first embodiment for transmitting the packet from the terminal device 13 to the moving terminal device 11 is next described while referring to the flowchart in FIG. 27. In step S11, the terminal device 13 indicates the host name of terminal device 11, and makes a request to the domain name server 14 for the node identifier and the home position indicator of terminal device 11. In step S12, the name server 12 transmits the node identifier and the home position indicator of terminal device 11 to terminal device 13.

In step S13, the terminal device 13 links the receive home position indicator and node identifier, and generates an LIN6 address. In step S14, the terminal device 13 transmits a packet to the mapping agent 12 based on the IPv6 address generated in step S13.

In step S15, the mapping agent 12 rewrites the home position indicator of terminal device 11 set in the destination address of the received packet, into the current position indicator of terminal device 1 and sends the packet. In step S16, the terminal device 11 receives the packet that was sent.

In step S17, the terminal device 11 transmits the mapping update packet set with the current position indicator into the terminal device 13. In step S18, the terminal device 13 receives the mapping update packet.

In step S19, the terminal device 13 checks whether or not the authentication data of the mapping update packet received in the processing of step S18 is correct. When determined to be correct, the operation proceeds to step S20 and the current position indicator is registered in the terminal device 11. In step S21, the terminal device 13 transmits the packet to the terminal device 11 based on the current position indicator of terminal device 11 and the processing is complete.

In step S19 when determined that the authentication data is not correct, the current position indicator contained in the mapping update packet is also incorrect so that steps S20 and S21 are skipped, no changes are made in the mapping cache, and the processing is complete.

The terminal device 13 can in this way transmit a packet stored with the data to the terminal device 11.

The second embodiment of this invention is described next. The second embodiment differs from the first embodiment in the point that a plurality of mapping agents (for instance, mapping agents 12-1 and 12-2) are affiliated with one terminal device 11 unit; the point that the domain name server 14 stores the node identifier of the terminal device 11 corresponding to the host name of terminal device 11, and the IPv6 addresses for one or more mapping agents 12 corresponding to the terminal device 11; and the point that the mapping update packet has bits (hereafter referred to as S bits) requesting registration of two or more current position indicators for the mapping agent 12, the terminal device 13, or the router 18.

The terminal device 13 stores two or more current position indicators corresponding to the terminal device 11 and when transmitting a packet for the terminal device 11, generates and transmits a packet set with these respective two or more stored position indicators.

Figure 28:
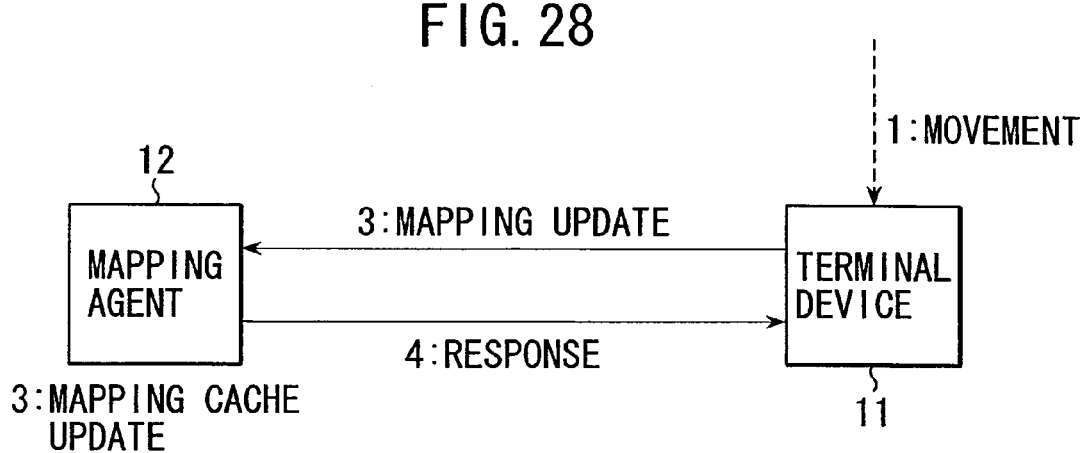
FIG. 28 is a drawing illustrating the operation for the terminal device 11 to notify the terminal device 13 of the current position indicator.
Figure 29:
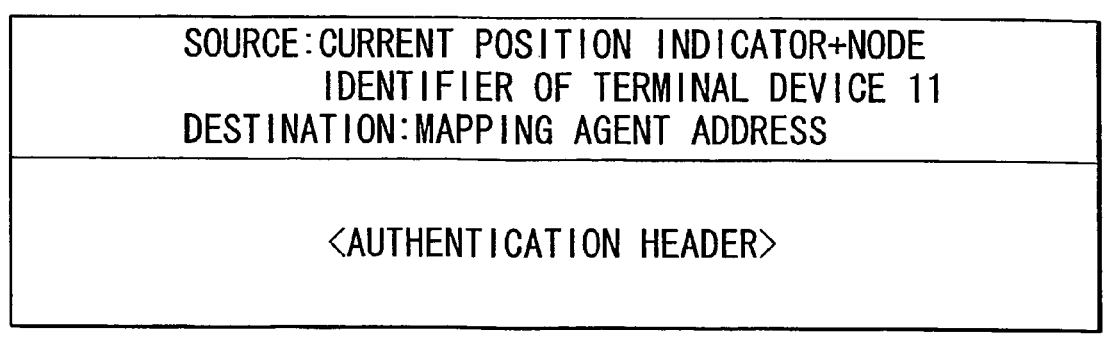
FIG. 29 is a drawing showing the mapping update packet of the second embodiment.

In the second embodiment, the operation for the terminal device 11 to notify the mapping agent 12 of the current position indicator is described while referring to FIG. 28. When the terminal device 11 has moved, the terminal device 11 acquires the position indicator corresponding to the wireless subnetwork 17 at the movement destination, from the base station 16 constituting the wireless subnetwork 17. The terminal device 11 generates a mapping update packet addressed to the mapping agent 12 and having an authentication header stored in the extension header as shown in FIG. 29, and transmits this packet to the mapping agent 12.

The mapping agent 12 checks whether or not the authentication data stored in the authentication header of the received mapping update packet is correct. When the authentication data is determined to be correct, the current position indicator set in the mapping update packet that was received, is registered in the mapping cache. The mapping agent 12 transmits the acknowledge response packet to the terminal device 11.

When two or more mapping agents 12 corresponding to the terminal device 11 have been accepted, the terminal device 11 transmits a mapping update packet to the mapping agent 12. The mapping agent 12 implements processing to check whether the respective authentication data is correct or not, and processing to register the current position indicator in the mapping cache.

Figure 30:
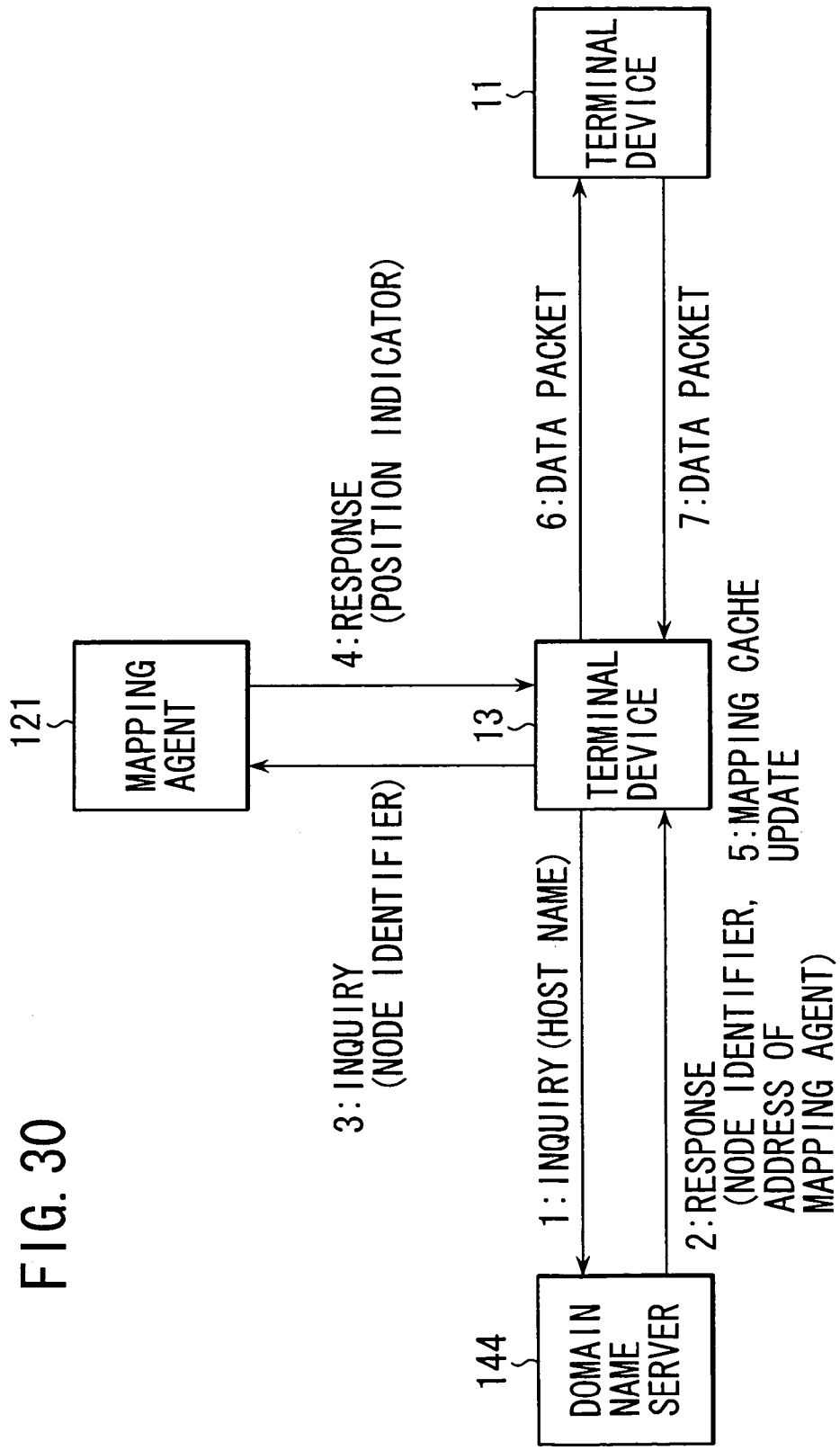
FIG. 30 is a drawing showing the packet transmission operation between the terminal device 13 and the terminal device 11 in the third embodiment.

Next, the operation for transmitting packets between the terminal device 13 and the terminal device 11 in the third embodiment is described while referring to the FIG. 30. The terminal device 13 shows the host name of terminal device 13 and makes an inquiry to the domain name server 144 (corresponding to the domain name server 14 of FIG. 16) about the IPv6 address of the mapping agent 121 related to the terminal device 11 and the node identifier of terminal device 11. The domain name server 144 has stored the IPv6 address of the mapping agent 121 related to the terminal device 11 and the node identifier of terminal device 11 that correspond to the host name shown in FIG. 31, so the IPv6 address of the mapping agent 121 related to the terminal device 11 and the node identifier of terminal device 11 are loaded (read out) and transmitted to the terminal device 13.

The domain name server 144 has stored the IPv6 address of one or more mapping agents 121 related to the terminal device 11 that correspond to the host name of terminal device 11. For example, for a terminal device host name of "aaaa", the domain name server 144 stores the corresponding IPv6 addresses "iiii", "jjjj" and "kkkk" of the respective mapping agents 121. For a terminal device host name of "bbbb", the domain name server 144 stores the corresponding IPv6 address "mmmm" of one mapping agent 121. For a terminal device host name of "ccccc", the domain name server 144 stores the respective IPv6 addresses "nnnn" and "oooo" of the two corresponding mapping agents 121.

When the IPv6 address for the node identifier and mapping agent of the terminal device corresponding to a terminal device host name of "aaaa" is requested, the domain name server 144 transmits the node identifier "αααα" and the IPv6 address "iiii" "jjjj" and "kkkk". When the IPv6 address for the node identifier and mapping agent of the terminal device corresponding to a terminal device host name of "bbbb" is requested, the domain name server 144 transmits the node identifier "ββββ" and the IPv6 address "mmmm". When the IPv6 address for the node identifier and home agent of the terminal device corresponding to a terminal device host name of "cccc" is requested, the domain name server 144 transmits the node identifier "γγγγ" and the IPv6 addresses "nnnn" and "oooo".

The terminal device 13 selects one IPv6 address from the IPv6 addresses corresponding to the one or more mapping agents 121 received from the domain name server 144, and based on the IPv6 address that was selected, display the terminal device 11 node identifier and inquires to the mapping agent 121 about the current position indicator of terminal device 11.

As shown in FIG. 32, the mapping agent 121 that received the inquiry, is stored with the current position indicator of terminal device 11 corresponding to the node identifier of terminal device 11, so the current position indicator of terminal device 11 is transmitted to the terminal device 13. The terminal device 13 registers the current position indicator of terminal device 11 received from the mapping agent 121, into the mapping cache. The terminal device 13 generates an LIN6 address linking the node identifier and the current position indicator of terminal device 11, and as shown in FIG. 33, transmits a packet set with the generated LIN6 address in the destination, to the terminal device 11.

The packet transmitted to the terminal device 11 from the terminal device 13, has the node identifier and current position indicator of terminal device 11 set in the LIN6 address, and therefore arrives at the terminal device 11 by an optimal path.

The domain name server 144 transmits the address of the mapping agent 121 to the terminal device 13 so that the mapping agent 121 can connect to the desired subnetwork. There are one or more mapping agents 121 corresponding to the terminal device 11, so that even if one of the mapping agents 121 is defective, the other mapping agent 121 can be utilized so that communication with the terminal device 11 can be performed.

As shown in FIG. 34, the packet transmitted to terminal device 13 from terminal device 11 is set in the source with the current position indicator of terminal device 11 and the node identifier. Also, the IPv6 address of the terminal device 13 is set in the destination so that the packet arrives at the terminal device 13 by the optimal path.

Figure 35:
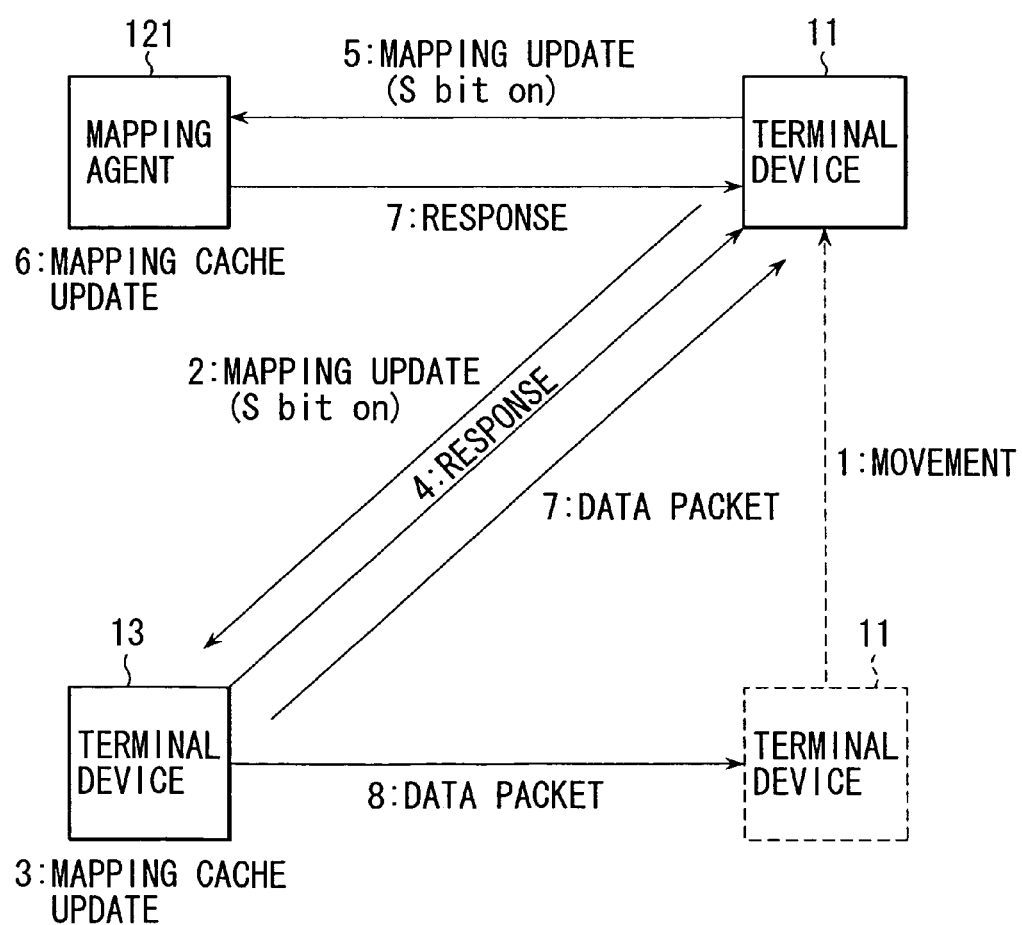
FIG. 35 is a drawing showing the operation when the terminal device 11 moved.
Figure 36:
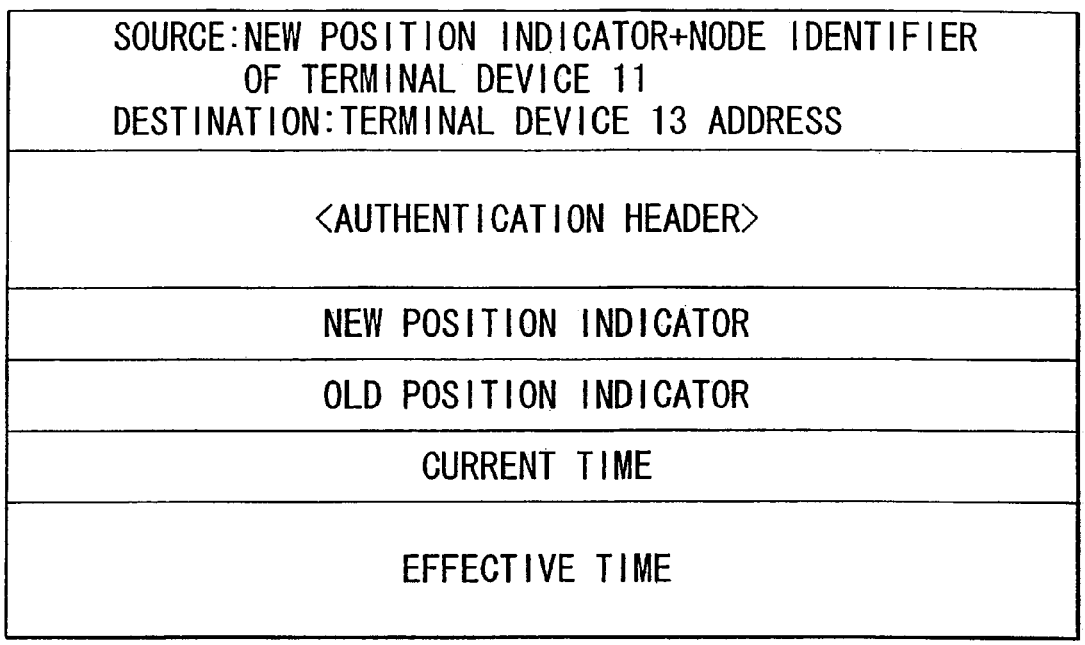
FIG. 36 is a drawing showing the mapping update packet the terminal device 11 transmits to the terminal device 13.

The operation when the terminal device 11 has moved is next described while referring to FIG. 35. When the terminal device 11 has moved, the terminal device 11 acquires the position indicator from the subnetwork 19 or the wireless subnetwork 17 of the movement destination. The terminal device 11 stores the old position indicator (corresponding to the one prior current position indicator), the new position indicator (the position indicator acquired from subnetwork 19 for the movement destination (corresponding to the current position indicator at the current point in time)), the current time, and the effective time as shown in FIG. 36, and transmits the mapping update packet set with the S bit to the terminal device 13

The terminal device 13 registers the old position indicator and new position indicator (current position indicator) stored in the mapping update packet received from terminal device 11, into the mapping cache. The terminal device 13 transmits the acknowledge response packet to the terminal device 11.

Figure 37:
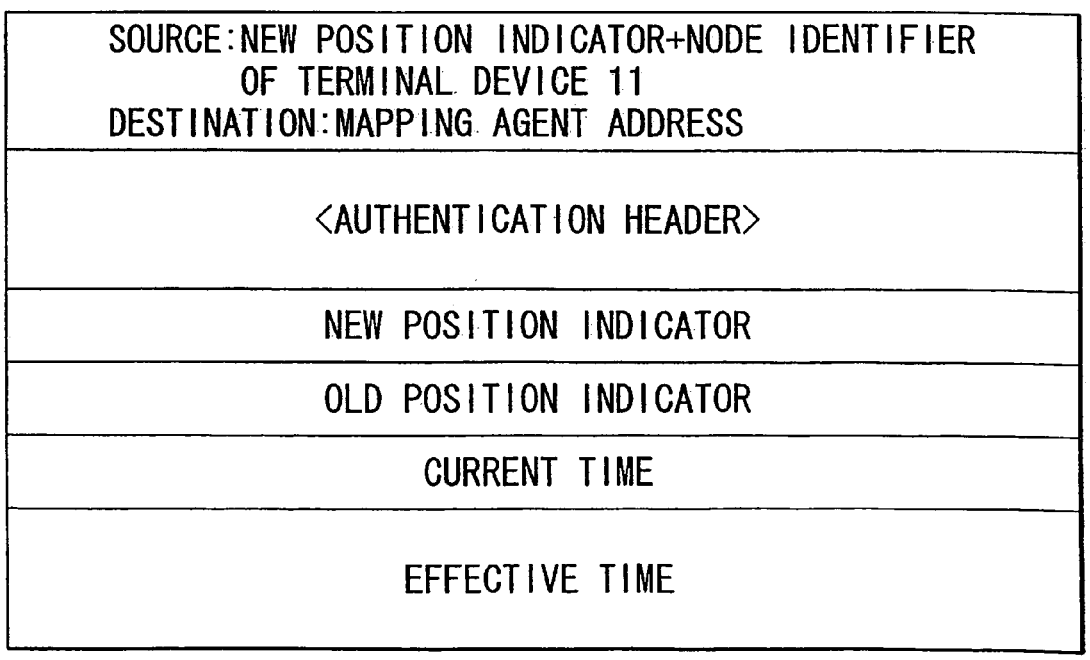
FIG. 37 is a drawing showing the mapping update packet the terminal device 11 transmits to the terminal device 131.

The terminal device 11 stores the old position indicator, new position indicator (position indicator acquired from subnetwork 19 movement destination (corresponding to current position indicator at the current point in time)), the current time, and the effective time as shown in FIG. 37, and transmits the mapping update packet set with the S bit to the mapping agent 121.

The mapping agent 121 registers the old position indicator and new position indicator (current position indicator) stored in the mapping update packet received from terminal device 11, into the mapping cache. The mapping agent 121 transmits the acknowledge response packet to the terminal device 11.

When transmitting a packet is transmitted to the terminal device 11, the terminal device 13, along with transmitting a packet set with a node identifier and new position indicator of terminal device 11 as the destination shown in FIG. 38, also transmits a packet set with the node identifier and old position indicator of terminal device 11 as the destination address shown in FIG. 39.

When for instance, the terminal device 11 is positioned at the boundary of the wireless subnetwork 17-1 and wireless subnetwork 17-2 shown in FIG. 16, the (radio wave) field strength fluctuates so that the terminal device 11 sometimes appears to be moving repeatedly between the wireless subnetwork 17-1 and wireless subnetwork 17-2 (In other words, the terminal device 11 is alternately repeating the communication with base station 16-1 and the communication with base station 16-2.).

Figure 1:
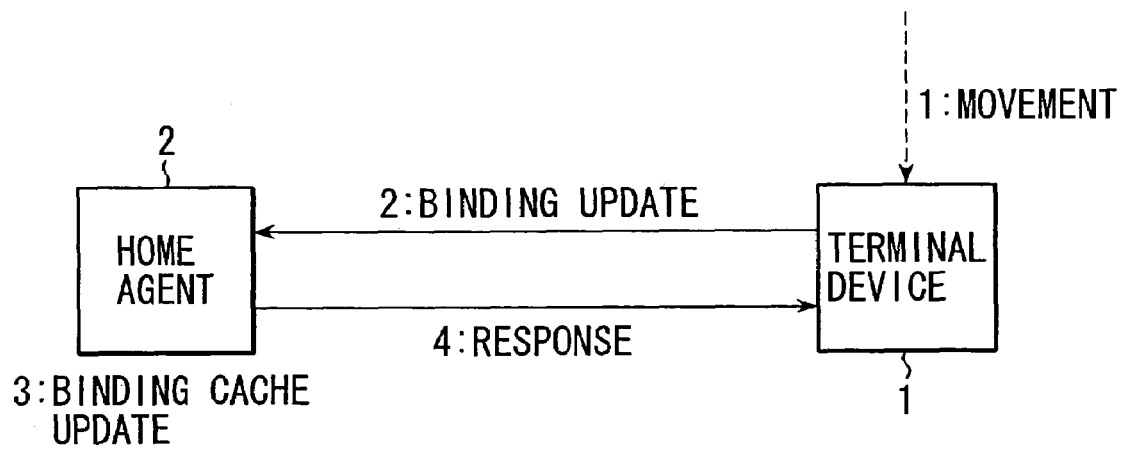
FIG. 1 is a drawing describing the procedure for registering the destination address.
Figure 2:
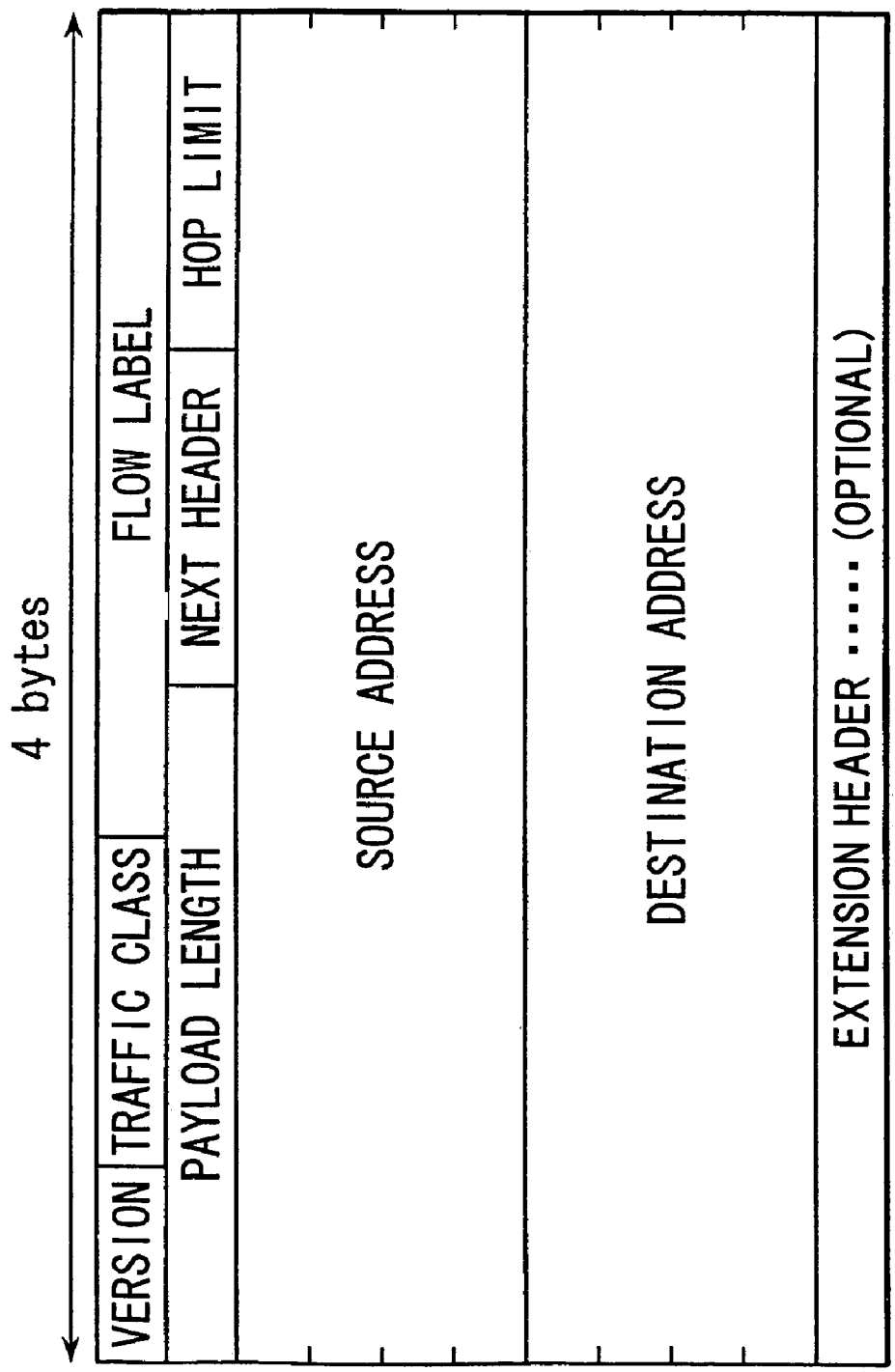
FIG. 2 is a drawing showing the format of the IPv6 header.
Figure 3:
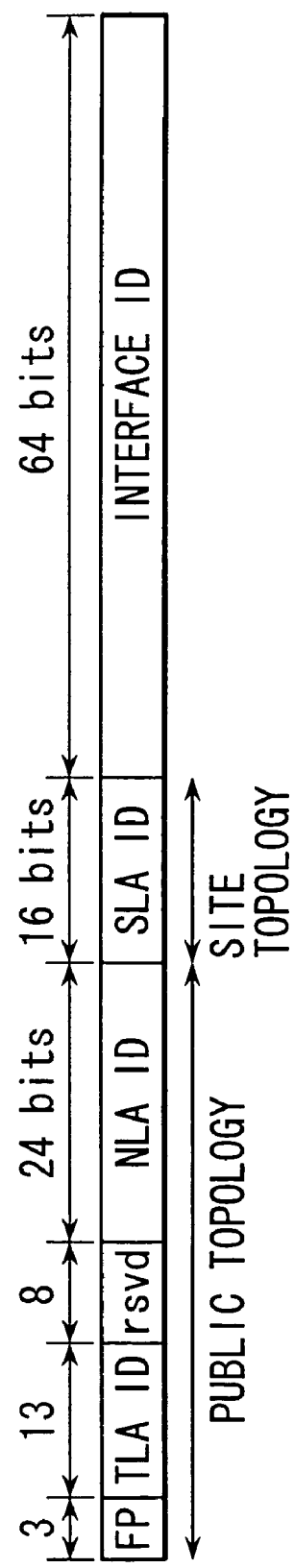
FIG. 3 is a drawing showing the format of the IPv6 address.
Figure 4:
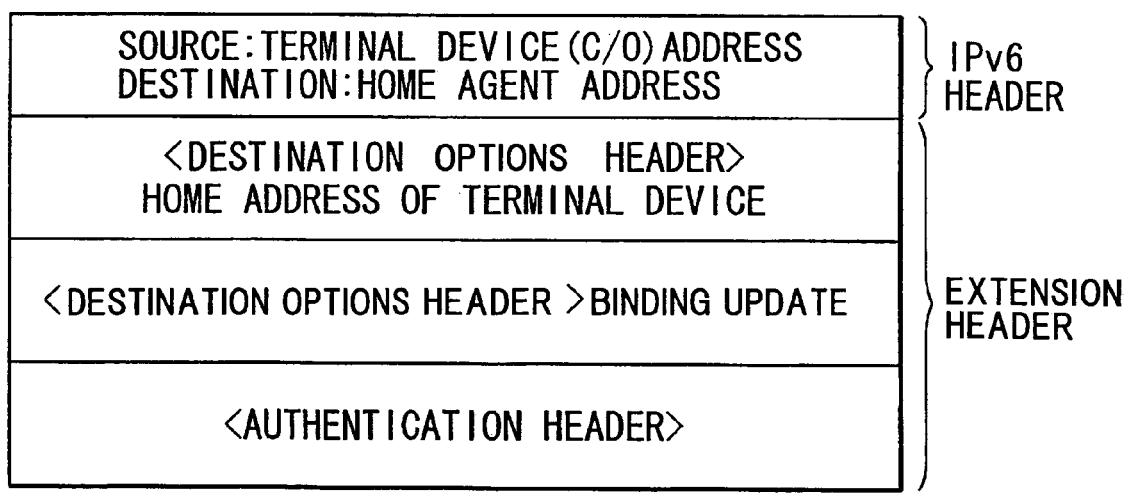
FIG. 4 is a drawing showing the binding update packet of the related art.
Figure 5:
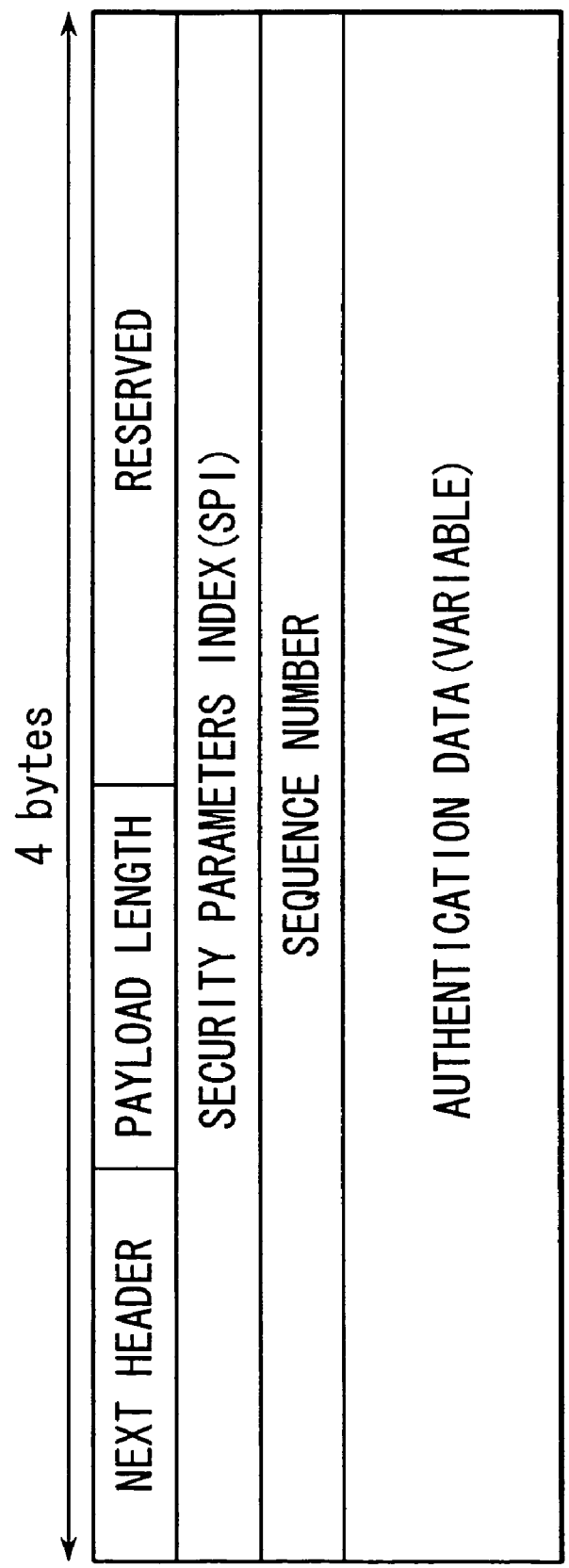
FIG. 5 is a drawing describing the authentication header.
Figure 6:
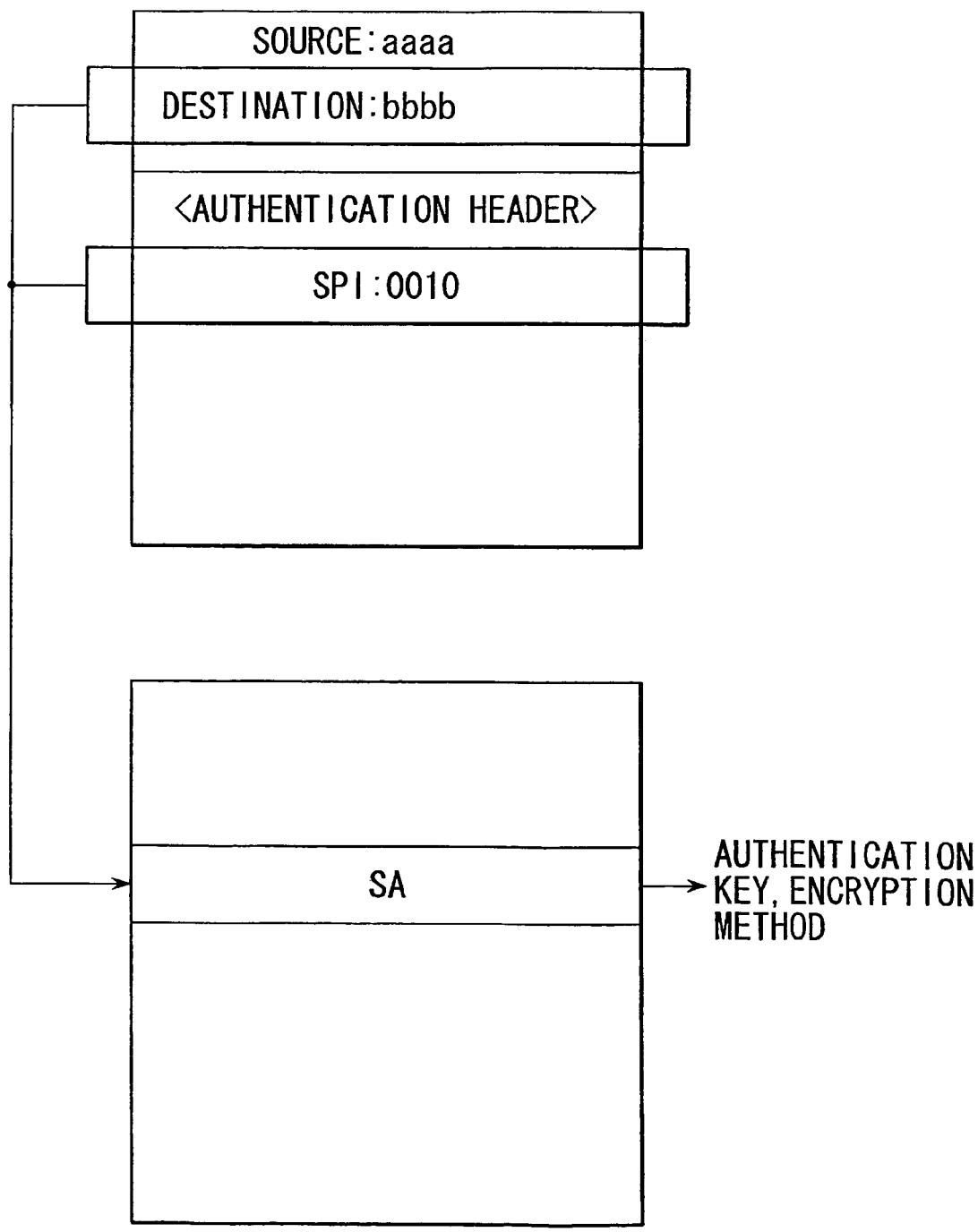
FIG. 6 is a drawing showing the overall concept of the authentication processing.
Figure 7:
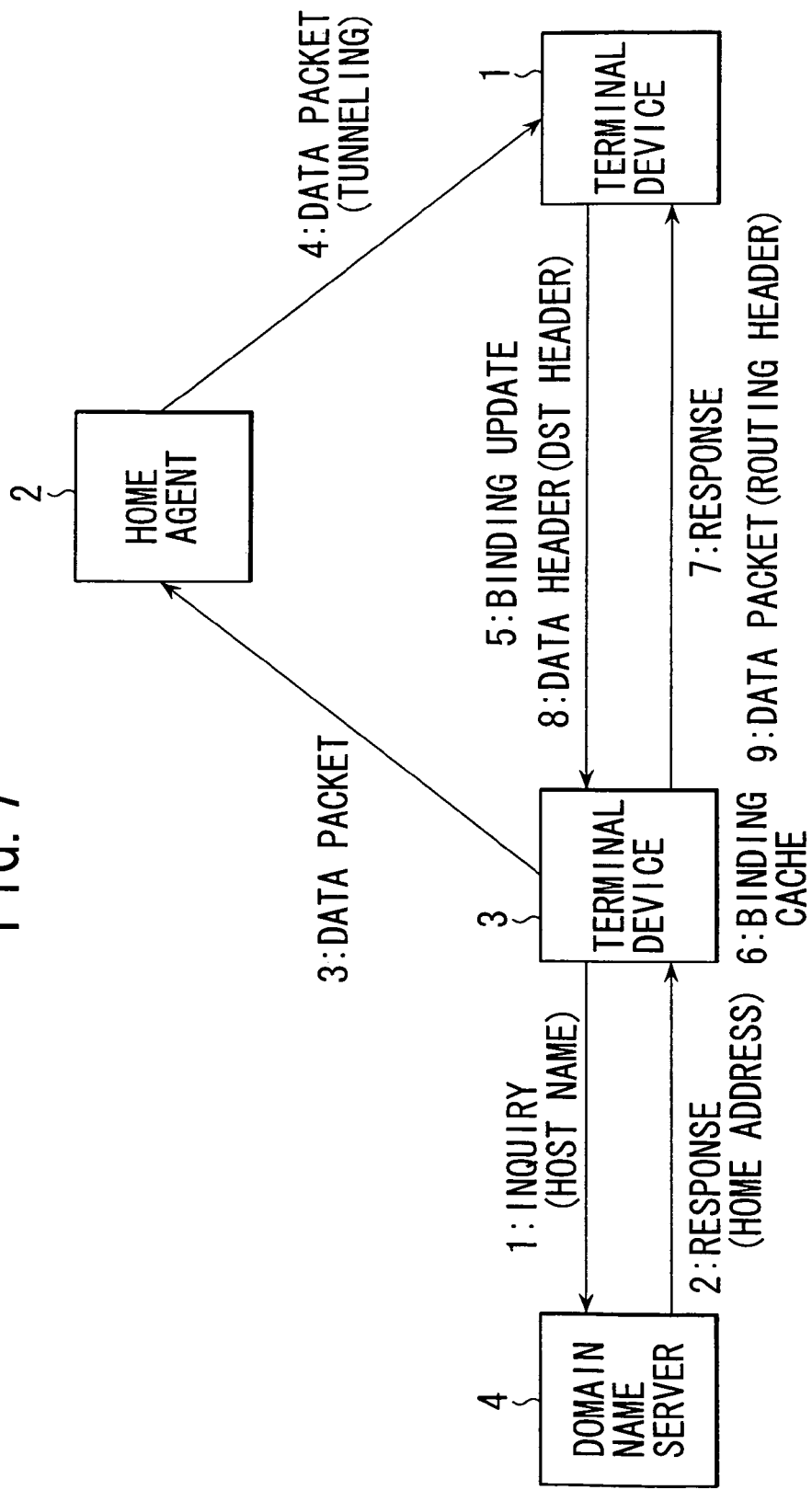
FIG. 7 is a drawing showing the procedure for transmitting a packet from the terminal device 3 of the related art to the moving terminal device 1.
Figure 10:
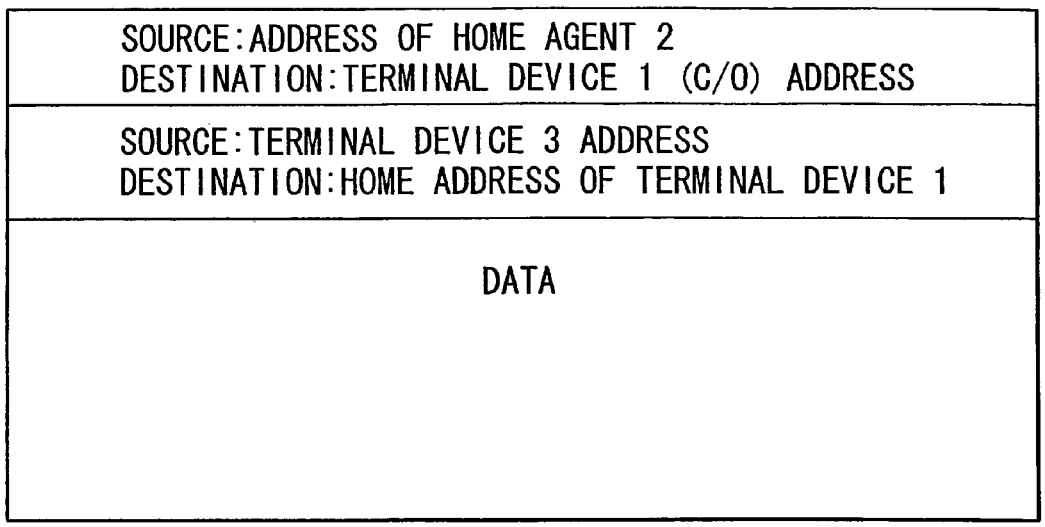
FIG. 10 is a drawing showing the packet sent by the home agent 2.
Figure 11:
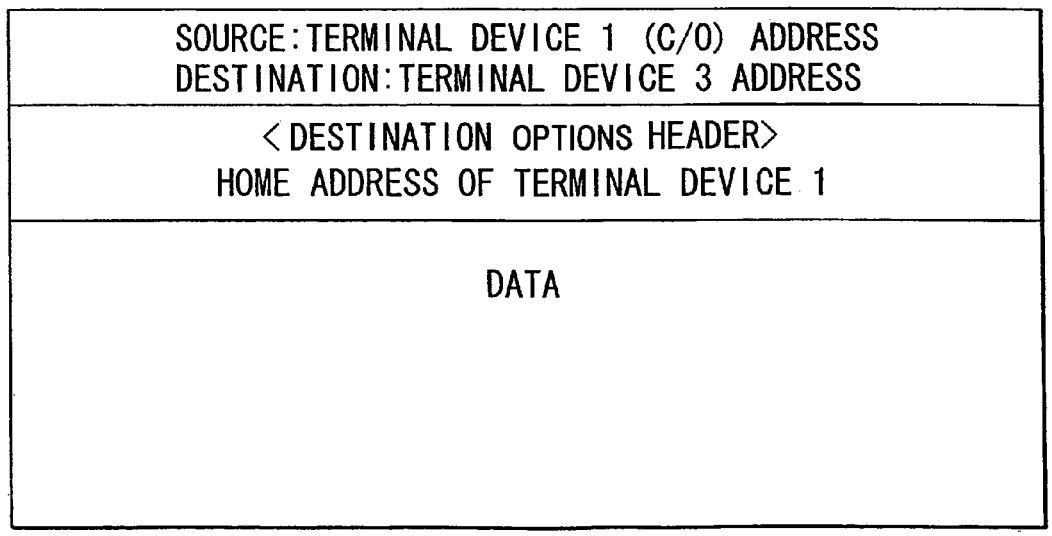
FIG. 11 is a drawing showing the packet sent from the terminal device 1 to the terminal device 3.
Figure 12:
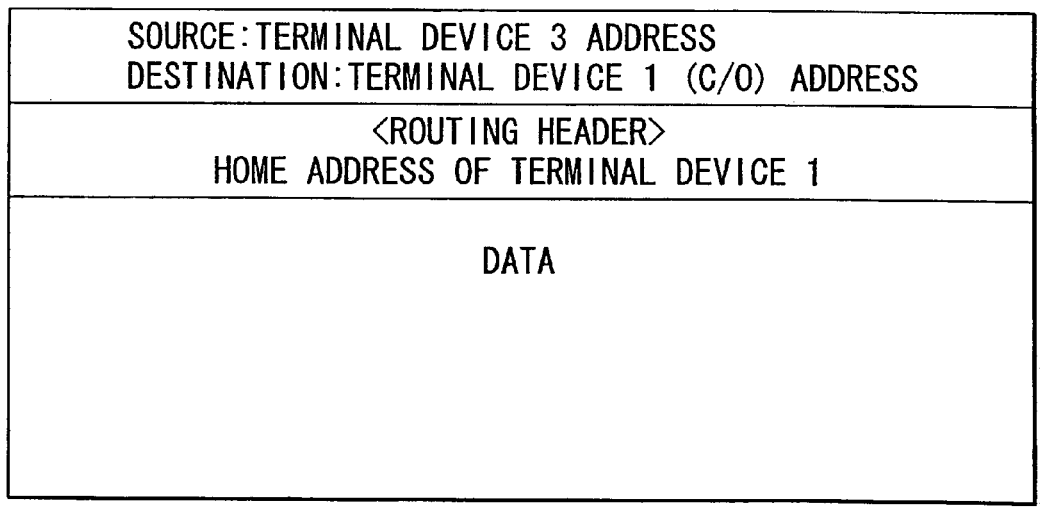
FIG. 12 is a drawing describing the routing header attached to the packet transmitted to the terminal device 1 from the terminal device 3.
Figure 13:
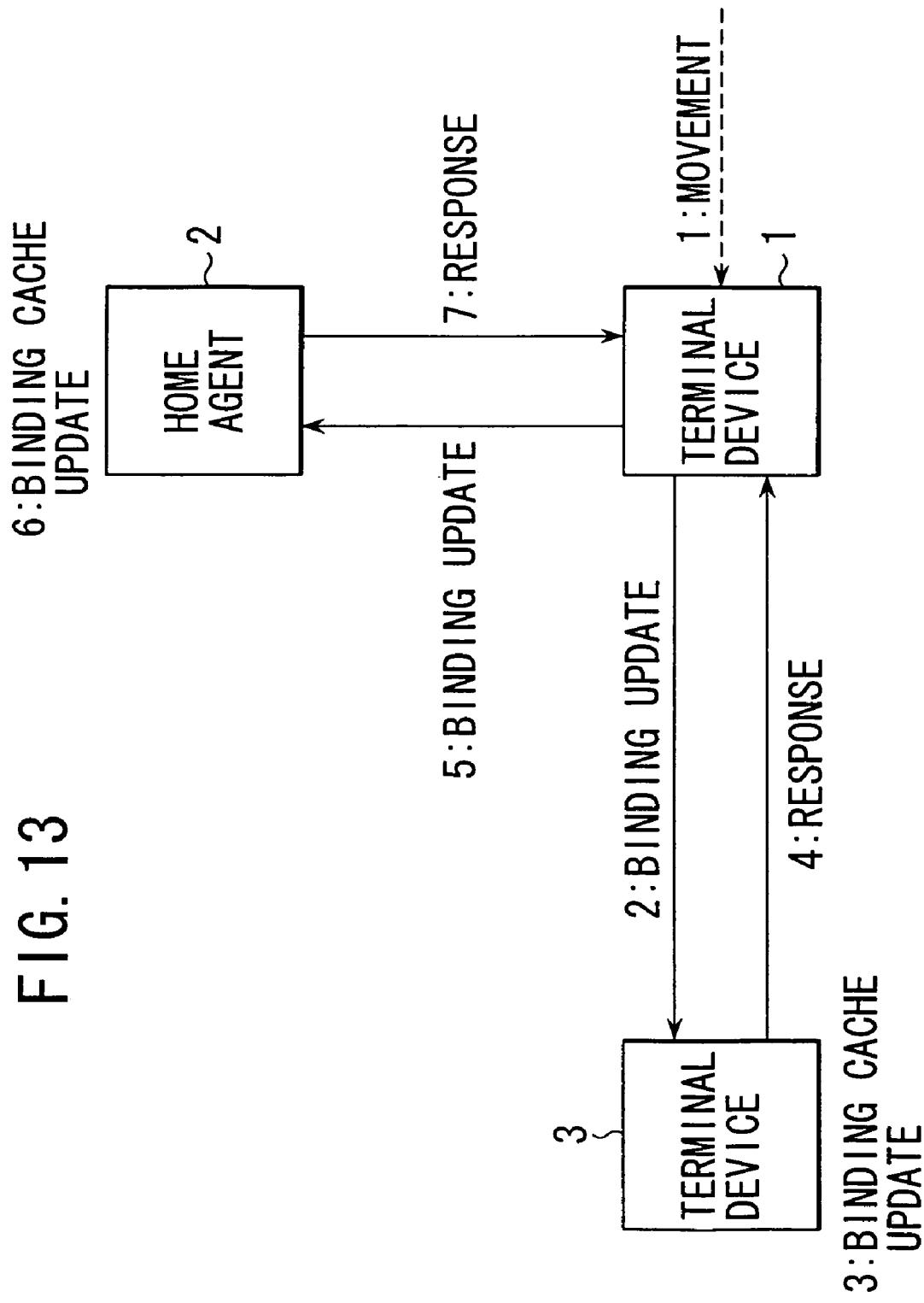
FIG. 13 is a drawing describing the operation when the terminal device 1 has moved.
Figure 14:
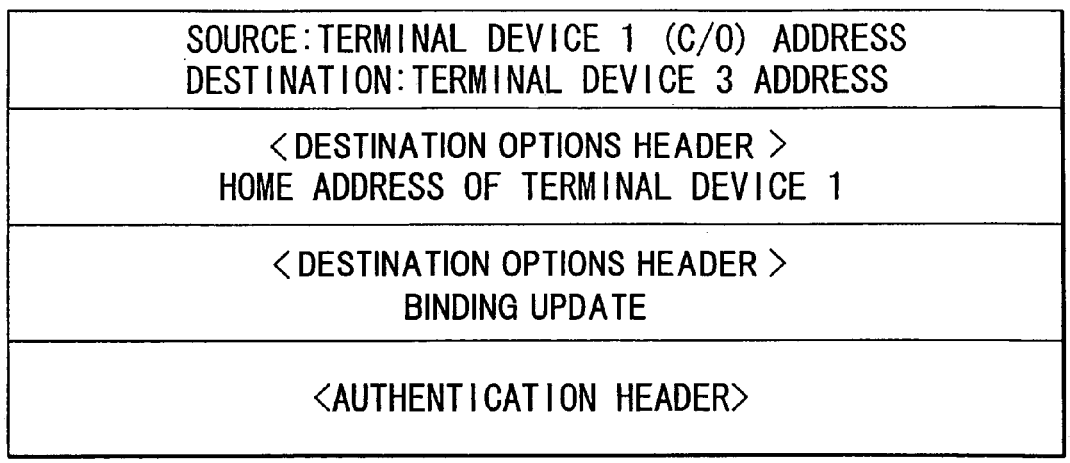
FIG. 14 is a drawing describing the binding update packet.
Figure 15:
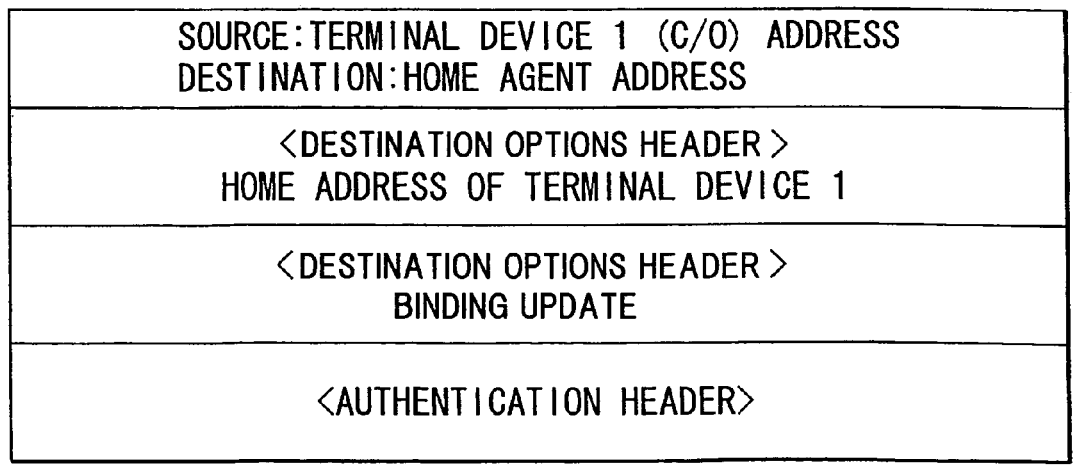
FIG. 15 is a drawing describing the binding update packet.

The terminal device 13, along with transmitting a packet set with a node identifier and new position indicator of terminal device 11 as shown in FIG. 11, also transmits a packet set with the node identifier and old position indicator of terminal device 11 so that even if the terminal device 11 is positioned at the boundary of the wireless subnetwork 17-1 and wireless subnetwork 17-2, the terminal device 11 can reliably transmit the packet.

Figure 40:
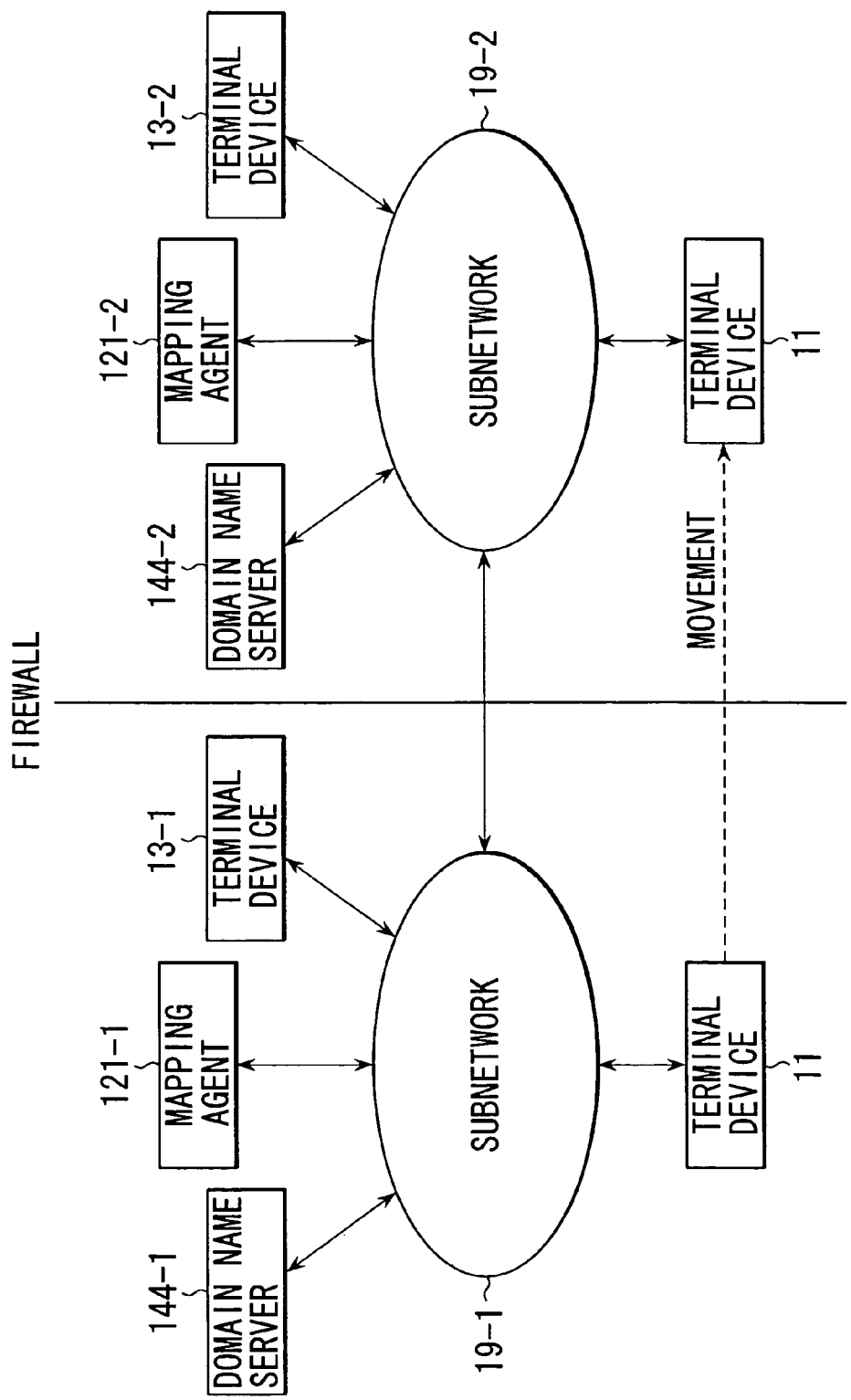
FIG. 40 is a drawing showing terminal device 11 communication on the network installed with a firewall.

Further, if a firewall is installed between the wireless subnetwork 19-1 and the wireless subnetwork 19-2 as shown in FIG. 40, when the terminal device 11 is connected to the wireless subnetwork 19-1, communication is possible with the terminal device 13-1 based on the domain name server 144-1 and mapping agent 121-1 service. When the terminal device 11 is connected to the wireless subnetwork 19-2, communication is possible with the terminal device 13-2 based on the domain name server 144-2 and mapping agent 121-2 service.

Also, when the terminal device 11 has transmitted a mapping update packet as shown in FIG. 36 to the terminal device 13, or has transmitted a mapping update packet as shown in FIG. 37 to the mapping agent 121, the router 18 for sending these mapping update packet, is capable of rewriting the position indicator corresponding to the terminal device 11 registered in the router mapping cache as shown in FIG. 41.

The rewriting of the router mapping cache is next explained. As shown in FIG. 41, a new position indicator (corresponding to current position indicator at the current point in time), old position indicator (corresponding to the one prior current position indicator), the time, and the effective time, corresponding to the node identifier are stored in the router mapping cache.

The operation for rewriting the position indicator corresponding to the terminal device 11 registered in the router mapping cache of the router 18 is described next while referring to FIG. 16.

When the terminal device 11 has started within the wireless subnetwork 17-1, the terminal device 11 acquires the position indicator corresponding to the wireless subnetwork 17-1, and transmits the mapping update packet in which are stored the position indicator corresponding to the wireless subnetwork 17-1, to the mapping agent 121. The "old position indicator" field of the mapping update packet shown in FIG. 37 is blank at this time.

The data for the current time is stored in the "current time" field of the mapping update packet, and the data for the effective time is stored in the "effective time" field of the mapping update packet.

The "old position indicator" field is blank when the router 18-5 sends the mapping update packet so an entry for the terminal device 11 is not generated in the router mapping cache.

In the same way, the "old position indicator" field is blank when the router 18-3, router 18-2 and router 18-1 send mapping update packets so that entries for the terminal device 11 are not generated in the router mapping cache.

Next, when the terminal device 11 has moved from the wireless subnetwork 17-1 to the wireless subnetwork 17-2, the terminal device 11 acquires the position indicator corresponding to the wireless subnetwork 17-2, and the mapping agent storing the position indicator (old position indicator) corresponding to wireless subnetwork 17-1 and the position indicator (new position indicator) corresponding to wireless subnetwork 17-2, is transmitted to the mapping agent 121. In other words, the position indicator corresponding to the wireless subnetwork 17-1 is stored in the "old position indicator" field of the mapping update packet, and the position indicator corresponding to the wireless subnetwork 17-2 is stored in the "new position indicator" field of the mapping update packet shown in FIG. 37.

When the router 18-5 sends the mapping update packet stored with the position indicator corresponding to wireless subnetwork 17-1 in "old position indicator" field, and stored with the position indicator corresponding to wireless subnetwork 17-2 in the "new position indicator" field, the "old position indicator" field is not blank, and the destination of the packet matching the old position indicator is different from the destination of the packet matching the new position indicator, so that an entry corresponding to the terminal device 11 in the router mapping cache stored in the router 18-5 is generated. The router 18-5 stores the current time data of the mapping update packet into the entry time of the current time data router mapping cache, and stores the effective time data of the mapping update packet into the effective time entry of the router mapping cache.

When the router 18-3 sends the mapping update packet stored with the position indicator corresponding to wireless subnetwork 17-1 in the "old position indicator" field, and stored with the position indicator corresponding to wireless subnetwork 17-2 in the "new position indicator" field, the "old position indicator" field is not blank, and the destination of the packet matching the old position indicator is different from the destination of the packet matching the new position indicator, so that so that an entry corresponding to the terminal device 11 in the router mapping cache stored in the router 18-3 is generated. The router 18-3 stores the current time data of the mapping update packet into the entry time of the current time data router mapping cache, and stores the effective time data of the mapping update packet into the effective time entry of the router mapping cache.

When the routers 18-1 and 18-2 send the mapping update packet stored with the position indicator corresponding to wireless subnetwork 17-1 in the "old position indicator" field, and stored with the position indicator corresponding to wireless subnetwork 17-2 in the "new position indicator" field, the destination of the packet matching the old position indicator and the destination of the packet matching the new position indicator are the same so that no entries corresponding to terminal device 11 stored in the respectively stored router mapping caches are generated.

When the terminal device 11 has moved from the wireless subnetwork 17-2 to the wireless subnetwork 17-3, the terminal device 11 acquires the position indicator corresponding to the wireless subnetwork 17-3, and transmits the mapping update packet stored with the position indicator corresponding to wireless subnetwork 17-2 in the "old position indicator" field, and stored with the position indicator corresponding to wireless subnetwork 17-3 in the "new position indicator" field, to the mapping agent 121. In other words, a position indicator corresponding to the wireless subnetwork 17-2 is stored in the "old position indicator" field, and a position indicator corresponding to the wireless subnetwork 17-3 is stored in the "new position indicator" field, of the mapping update packet shown in FIG. 37.

When the router 18-7 sends the mapping update packet stored with the position indicator corresponding to wireless subnetwork 17-2 in the "old position indicator" field, and stored with the position indicator corresponding to wireless subnetwork 17-3 in the "new position indicator" field, the "old position indicator" field is not blank, and the destination of the packet matching the old position indicator is different from the destination of the packet matching the new position indicator, so that so that an entry corresponding to the terminal device 11 in the router mapping cache stored in the router 18-7 is generated. The router 18-7 stores the current time data of the mapping update packet into the entry time of the current time data router mapping cache, and stores the effective time data of the mapping update packet into the effective time entry of the router mapping cache.

When the router 18-4 sends the mapping update packet stored with the position indicator corresponding to wireless subnetwork 17-2 in the "old position indicator" field, and stored with the position indicator corresponding to wireless subnetwork 17-3 in the "new position indicator" field, the "old position indicator" field is not blank, and the destination of the packet matching the old position indicator is different from the destination of the packet matching the new position indicator, so that an entry corresponding to the terminal device 11 in the router mapping cache stored in the router 18-4 is generated. The router 18-4 stores the current time data of the binding update packet into the entry time of the current time data router mapping cache, and stores the effective time data of the mapping update packet into the effective time entry of the router mapping cache.

When the router 18-2 sends the mapping update packet stored with the position indicator corresponding to wireless subnetwork 17-2 in the "old position indicator" field, and stored with the position indicator corresponding to wireless subnetwork 17-3 in the "new position indicator" field, the "old position indicator" field is not blank, and the destination of the packet matching the old position indicator is different from the destination of the packet matching the new position indicator, so that the entry for the terminal device 11 in the router mapping cache stored in router 18-2 is rewritten, based on the old position indicator and the new position indicator stored in the mapping update packet. The router 18-2 updates the effective time and the entry time of the router mapping cache, based on the effective time data and the current time data of the mapping update packet.

When the router 18-1 sends the mapping update packet stored with the position indicator corresponding to wireless subnetwork 17-2 in the "old position indicator" field, and stored with the position indicator corresponding to wireless subnetwork 17-3 in the "new position indicator" field, the destination of the packet matching the old position indicator and the destination of the packet matching the new position indicator are the same so that no entry corresponding to terminal device 11 in the router mapping cache stored in router 18-1 is generated.

When the terminal device 11 has moved from the wireless subnetwork 17-3 to the wireless subnetwork 17-4, the terminal device 11 acquires the position indicator corresponding to the wireless subnetwork 17-4, and transmits the mapping update packet stored with the position indicator corresponding to wireless subnetwork 17-3 in the "old position indicator" field, and stored with the position indicator corresponding to wireless subnetwork 17-4 in the "new position indicator" field, to the mapping agent 121. In other words, a position indicator corresponding to the wireless subnetwork 17-3 is stored in the "old position indicator" field, and a position indicator corresponding to the wireless subnetwork 17-4 is stored in the "new position indicator" field, of the mapping update packet shown in FIG. 37.

When the router 18-8 sends the mapping update packet stored with the position indicator corresponding to wireless subnetwork 17-3 in the "old position indicator" field, and stored with the position indicator corresponding to wireless subnetwork 17-4 in the "new position indicator" field, the "old position indicator" field is not blank, and the destination of the packet matching the old position indicator is different from the destination of the packet matching the new position indicator, so that an entry corresponding to the terminal device 11 in the router mapping cache stored in the router 18-8 is generated. The router 18-8 stores the current time data of the mapping update packet into the entry time of the current time data router mapping cache, and stores the effective time data of the mapping update packet into the effective time entry of the router mapping cache.

When the router 18-4 sends the mapping update packet stored with the position indicator corresponding to wireless subnetwork 17-3 in the "old position indicator" field, and stored with the position indicator corresponding to wireless subnetwork 17-4 in the "new position indicator" field, the "old position indicator" field is not blank, and the destination of the packet matching the old position indicator is different from the destination of the packet matching the new position indicator, so that the entry for the terminal device 11 in the router mapping cache stored in router 18-4 is rewritten, based on the old position indicator and the new position indicator stored in the mapping update packet. The router 18-4 updates the effective time and the entry time of the router mapping cache, based on the effective time data and the current time data of the mapping update packet.

When the router 18-2 sends the mapping update packet stored with the position indicator corresponding to wireless subnetwork 17-3 in the "old position indicator" field, and stored with the position indicator corresponding to wireless subnetwork 17-4 in the "new position indicator" field, the destination of the packet matching the old position indicator and the destination of the packet matching the new position indicator are the same so that no entries corresponding to the terminal device 11 in the respective mapping caches are rewritten.

When the router 18-1 sends the mapping update packet stored with the position indicator corresponding to wireless subnetwork 17-3 in the "old position indicator" field, and stored with the position indicator corresponding to wireless subnetwork 17-4 in the "new position indicator" field, the destination of the packet matching the old position indicator and the destination of the packet matching the new position indicator are the same so that no entries corresponding to the terminal device 11 in the respective mapping caches are rewritten.

The router 18 deletes the router mapping cache entry whose effective time has elapsed, based on the current time obtained from effective time data, RTC (real time clock) of router 18 and current time data stored in the entry of the router mapping cache.

When the terminal device 13 transmits a packet addressed to the terminal device 11, and the router 18 sends that packet, the router 18 checks whether or not the position indicator for the destination address of the packet is the same as the old position indicator of the entry corresponding to terminal device 11 registered in the router mapping cache. When determined that the position indicator for the destination address of the packet is the same as the old position indicator for the entry corresponding to the terminal device 11 registered in the router mapping cache, the position indicator for the packet destination address, is rewritten to the new position indicator of the entry corresponding to the terminal device 11 registered in the router mapping cache and sent.

However, when determined that the position indicator for the packet destination address is not the same as the old position indicator for the entry corresponding to the terminal device 11 registered in the router mapping cache, the router 18 sends the packet as is, without rewriting the position indicator.

Even if the terminal device 13 transmits a packet addressed to terminal device 11 based on the old position indicator, the old position indicator is rewritten as the new position indicator so that the packet arrives at terminal device 11 without being discarded. An entry is generated corresponding to terminal device 11 in the router mapping cache of a router 18 having a packet destination for an old position indicator and a packet destination for a new position indicator that are different from each other. In other words, an entry is generated corresponding to terminal device 11 only in the router mapping cache of a router 18 whose position indicator is capable of being rewritten so that there is no problem with scalability.

Figure 42:
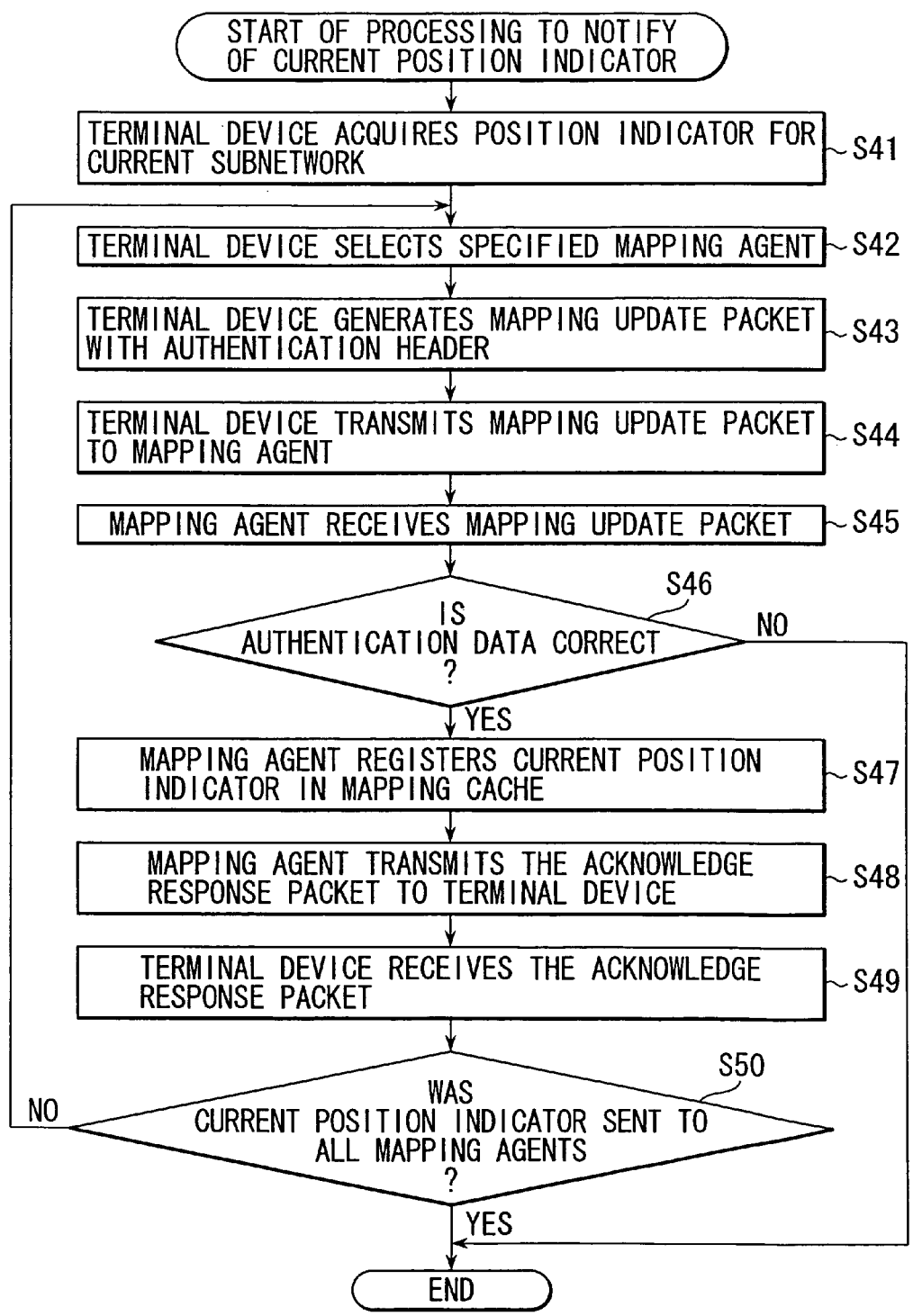
FIG. 42 is a flowchart illustrating the process for notifying the terminal device 131 of the current position indicator from the terminal device 11 in the third embodiment.

The procedure for sending notification of the current position indicator from the terminal device 11 to the mapping agent 121 in the third embodiment is next explained while referring to FIG. 42. In step S41, the communications section 43 of terminal device 11 acquires the current position indicator of subnetwork 19. In step S42, the communications section 43 of terminal device 11 selects the specified mapping agent. In step S43, the communications section 43 of terminal device 11 generates a mapping update packet with authentication header. In step S44, the communications section 43 of terminal device 11 transmits the generated mapping update packet selected in the processing in step S42, to the mapping agent 121.

In step S45, the mapping agent 121 receives the mapping update packet. In step S46, the mapping agent 12 checks whether or not the authentication data stored in the authentication header of the received mapping update packet is correct or not. When the authentication data is determined to be correct, the processing proceeds to step S47, and the current position indicator stored in the mapping update packet is registered in the mapping cache. In step S48, the mapping agent 121 transmits the acknowledge response packet to the terminal device 11. In step S49, the terminal device 11 receives the acknowledge response packet.

In step S50, the terminal device 11 checks whether or not the current position indicator was transmitted to all mapping agents 12 corresponding to terminal device 11. When determined that the current position indicator was not transmitted to all mapping agents 121, the process returns to step S42, and the processing to transmit the current position indicator to the mapping agents 121 is repeated.

When determined in step S50, that the current position indicator was sent to all mapping agents 121, the processing ends.

In step S46, when determined that the authentication data is not correct, the data stored in the received packet is not utilized and the processing ends.

In this way, the one or more mapping agents 121 corresponding to the terminal device 11 update the current position indicator corresponding to terminal device 11 stored in the mapping cache.

Figure 43:
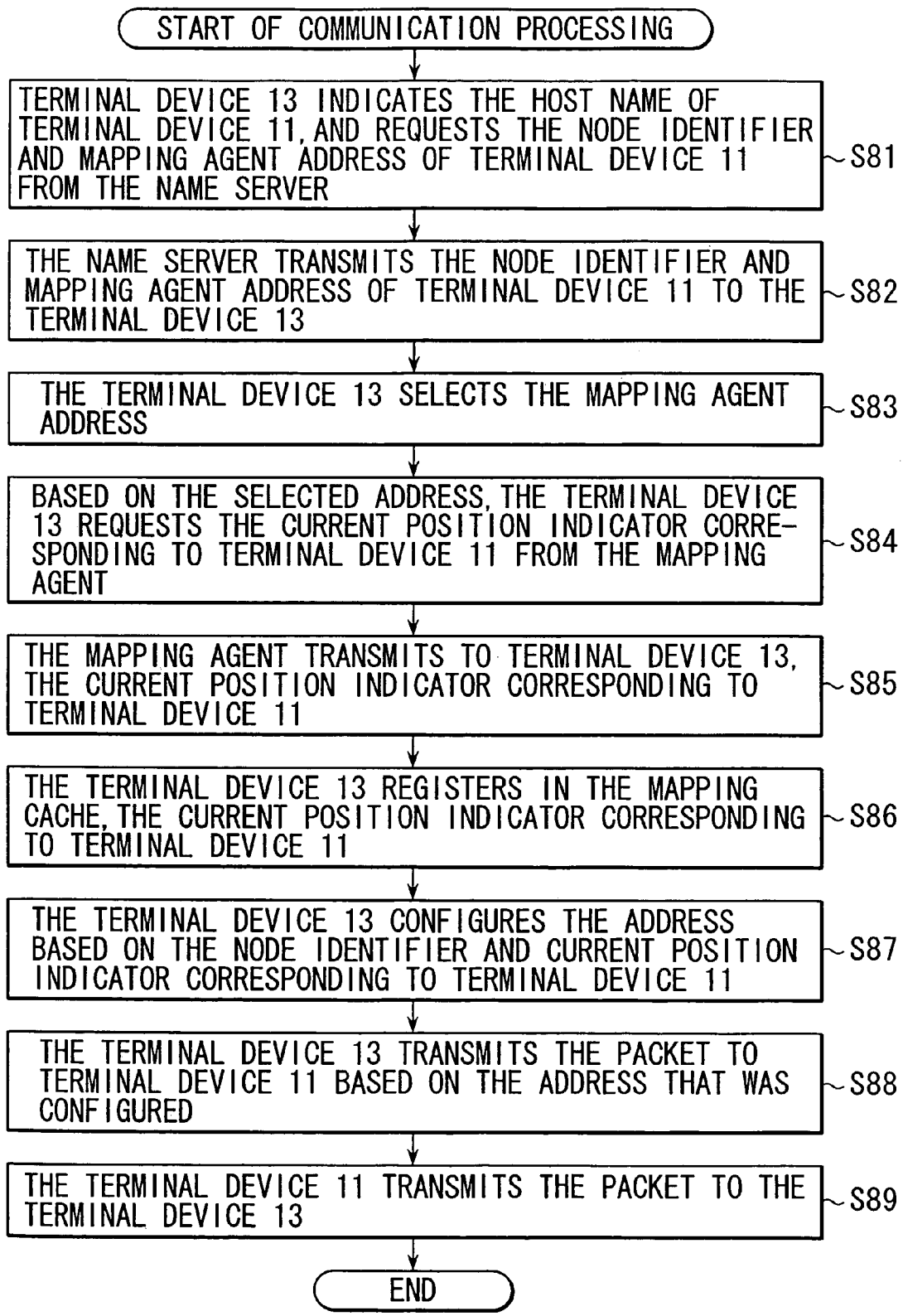
FIG. 43 is a flowchart illustrating the process for packet communication between the terminal device 13 and the terminal device 11 in the third embodiment.

Next, the process in the third embodiment for packet communication between terminal device 13 and terminal device 11 is explained while referring to the flowchart of FIG. 43. In step S81, the terminal device 13 indicates the host name of terminal device 11, and makes a request to the name server 144 for the node identifier and the address of mapping agent 121 corresponding to terminal device 11.

In step S82, the name server 144, transmits the node identifier and the address of mapping agent 121 corresponding to terminal device 11, to the terminal device 13. In step S83, the terminal device 13 selects the address of the specified mapping agent 121 from the mapping agent 121 addresses that were received.

In step S84, based on the address that was selected, the terminal device 13 makes a request to the mapping agent 121 for the current position indicator corresponding to terminal device 11. In step S85, the mapping agent 121 transmits to terminal device 13, the current position indicator corresponding to terminal 11.

In step S86, the terminal device 13 registers the current position indicator corresponding to terminal device 11, in the mapping cache. In step S87, the terminal device 13, configures the address, based on the node identifier and the current position indicator corresponding to terminal device 11. In step S87, the terminal device 13 transmits the packet to terminal device 11, based on the address that was configured.

In step S88, the terminal device 11 transmits the packet to terminal device 13. The packet transmitted in step S88, also arrives at the terminal device 13 by an optimal path.

The terminal device 13 can in this way transmit a packet to terminal device 11 by an optimal path. The terminal device 11 can transmit a packet to the terminal device 13 by an optimal path.

Figure 44:
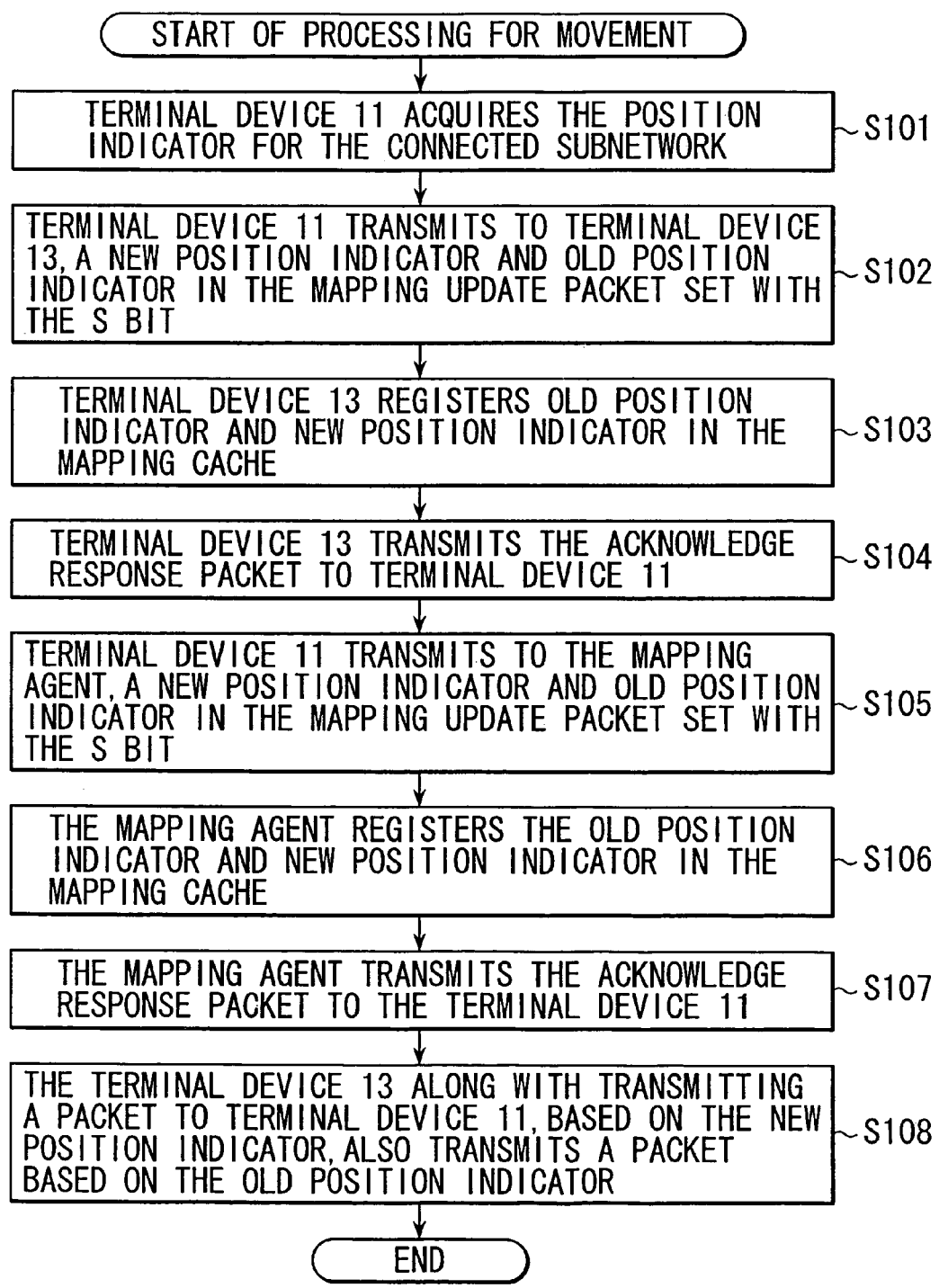
FIG. 44 is a flowchart illustrating the processing in the third embodiment when the terminal device 11 has moved.

The processing in the third embodiment, when the terminal device 11 has moved, is next described while referring to the flowchart of FIG. 44. In step S101, the communications section 43 of terminal device 11 acquires the position indicator of the connected subnetwork 19. In step S102, the communications section 43 of terminal device 11 transmits to the terminal device 13, a new position indicator (current position indicator) and old position indicator in the mapping update packet set with S bits.

In step S103, the terminal device 13 registers in the mapping cache, the new position indicator (current position indicator) and old position indicator stored in the mapping update packet that was received. In step S104, the terminal device 13 transmits an acknowledge response packet to the terminal device 11.

In step S105, the terminal device 11 transmits the new position indicator (current position indicator) and old position indicator in the mapping update packet set with S bits to the mapping agent 121. In step S106, the mapping agent 121 registers in the mapping cache, the new position indicator (current position indicator) and old position indicator stored in the mapping update packet that was received. In step S107, the mapping agent 121 transmits the acknowledge response packet to the terminal device 11.

In step S108, besides transmitting the packet based on the new position indicator, to the terminal device 11, the terminal device 13 also transmits a packet based on the old position indicator and the processing ends.

Therefore, even if the terminal device 11 moves, the terminal device 13 can transmit a packet to the terminal device 11. Further, even if the terminal device 11 is positioned on the boundary of the wireless subnetwork 11 and the wireless subnetwork 17, the terminal device 13 can reliably transmit a packet to the terminal device 11.

Figure 45:
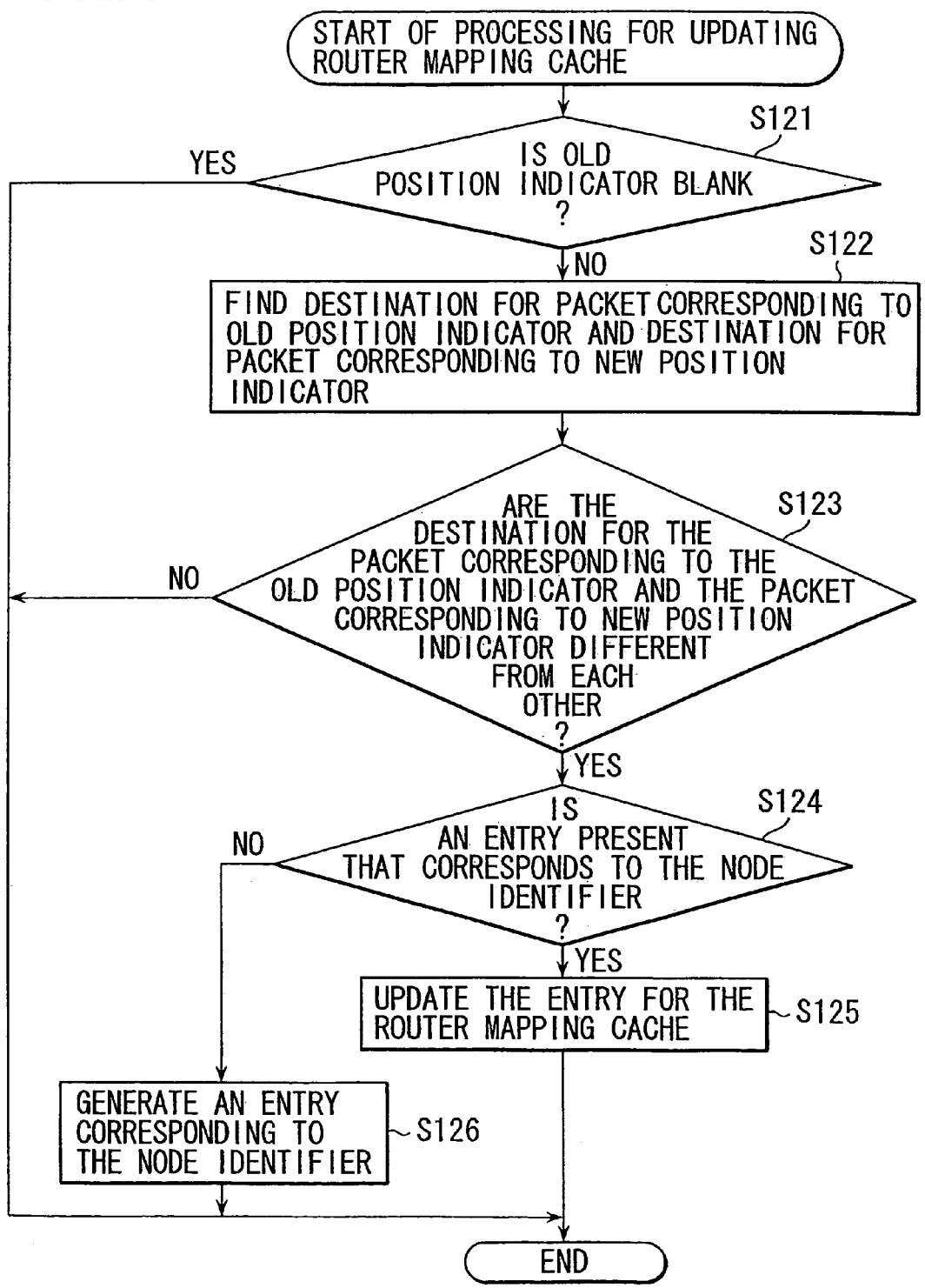
FIG. 45 is a flowchart describing the process for updating the router mapping cache.

The processing for rewriting the router mapping cache executed by the router 81 for running the router mapping cache manager program, when the mapping update packet stored with the old position indicator and new position indicator is received, is next described while referring to the flowchart in FIG. 45. In step S121, the router mapping cache manager program checks whether or not the old position indicator of the received packet is blank. When determined that the old position indicator is not blank, the operation proceeds to step S122, and the destination of the packet corresponding to the new position indicator and the destination of the packet corresponding to the old position indicator are found.

In step S123, the router mapping cache manager program checks whether or not the destination of the packet matching the new position indicator and the destination of the packet for the old position indicator are different. When determined that the destination of the packet matching the new position indicator and the destination of the packet for the old position indicator are different, the operation proceeds to step S124, and a check is made to find if an entry is present, corresponding to the node identifier stored in the packet in the mapping cache.

In step S124, when determined that an entry is present corresponding to the node identifier stored in the packet in the mapping cache, the operation proceeds to step S125, and the router mapping cache manager program updates the router mapping cache entry corresponding to the node identifier, based on data stored in the mapping update packet, and the processing ends.

In step S124, when determined that no entry is present corresponding to the node identifier stored in the packet in the mapping cache, the operation proceeds to step S126, and the router mapping cache manager program generates a router mapping cache entry corresponding to the node identifier, based on data stored in the mapping update packet, and the processing ends.

In step S123, when determined that the destination corresponding to the old packet indicator and the destination corresponding to the new packet indicator are the same, no generation or rewriting of the router mapping cache entry is performed, and the processing ends.

In step S121, when determined that the old position indicator is blank, the rewriting or generation of the router mapping cache cannot be performed so that the processing ends unchanged.

The router 18 as explained above updates or generates the router mapping cache entry as described above.

Figure 46:
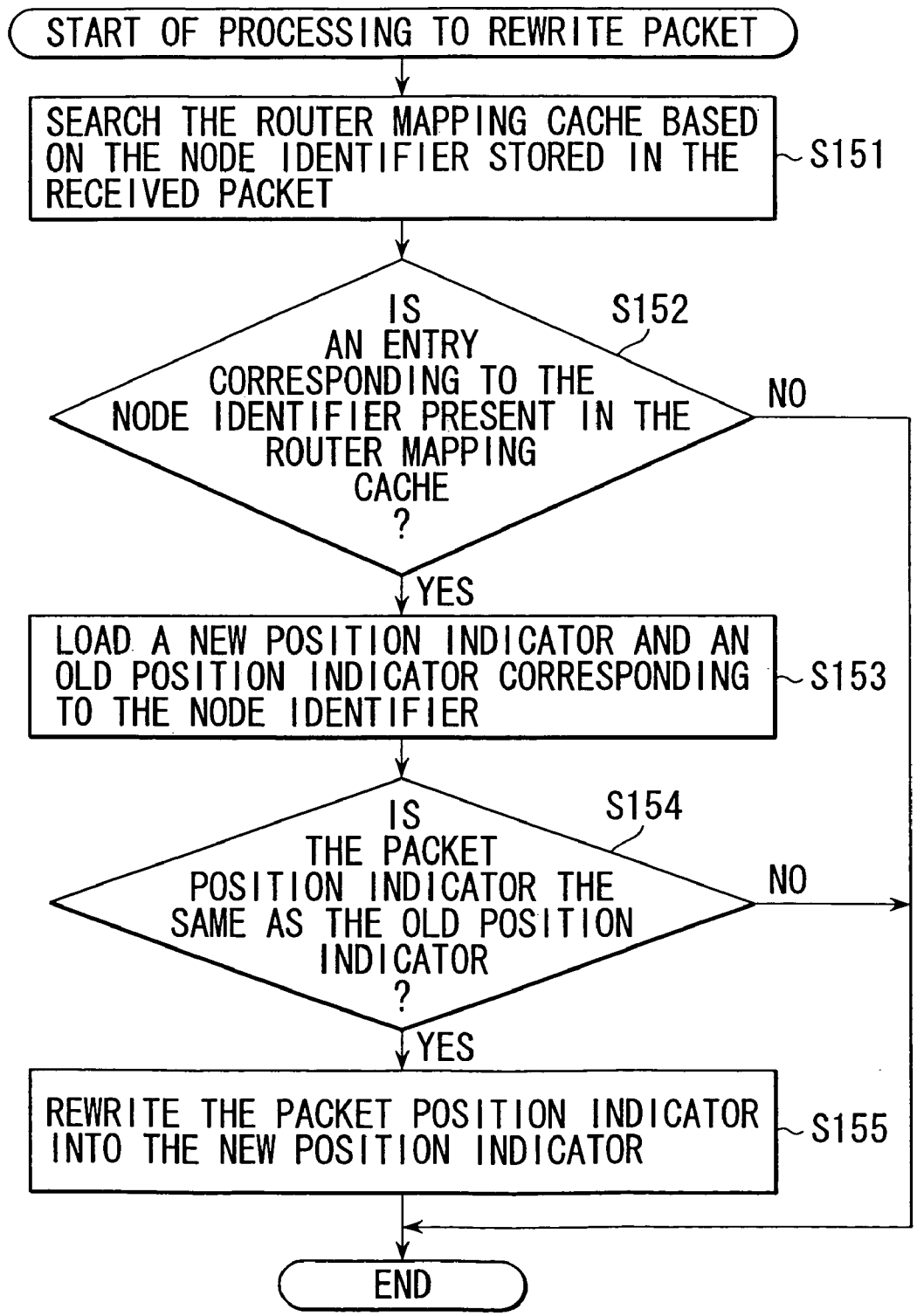
FIG. 46 is a flowchart describing the process for rewriting the position indicator of the packet.

The processing for rewriting the packet position indicator by the router 18 that is implemented by running the packet transfer program when the router 18 receives the packet, is next explained while referring to the FIG. 46. In step S151, the packet transfer program searches the router mapping cache based on the node identifier stored in the packet that was received.

In step 152, the packet transfer program checks whether or not an entry corresponding to the node identifier stored in the received packet is present in the router mapping cache. When determined that an entry corresponding to the node identifier is present, the operation proceeds to step S153 and the new position indicator and old position indicator corresponding to the node identifier are read out (loaded)

In step 154, the packet transfer program determines whether or not the packet position indicator is the same as the old position indicator. When determined that the position indicator stored in the packet is the same as the old position indicator, the operation proceeds to step S155, the packet position indicator is rewritten to the new position indicator, and the processing ends.

When determined in step S154, that the position indicator stored in the packet is not the same as the old position indicator, the step S155 is skipped and the processing ends.

When determined in step S152 that an entry corresponding to the node identifier is not present, the position indicator cannot be rewritten, so the processing ends.

The router 18, as described above, sends the packet after the rewriting in the above processing. The router 18 has rewritten the old position indicator to the new position indicator, so that the packet that is sent, definitely arrives at the terminal device 11 without being lost.

Figure 47:
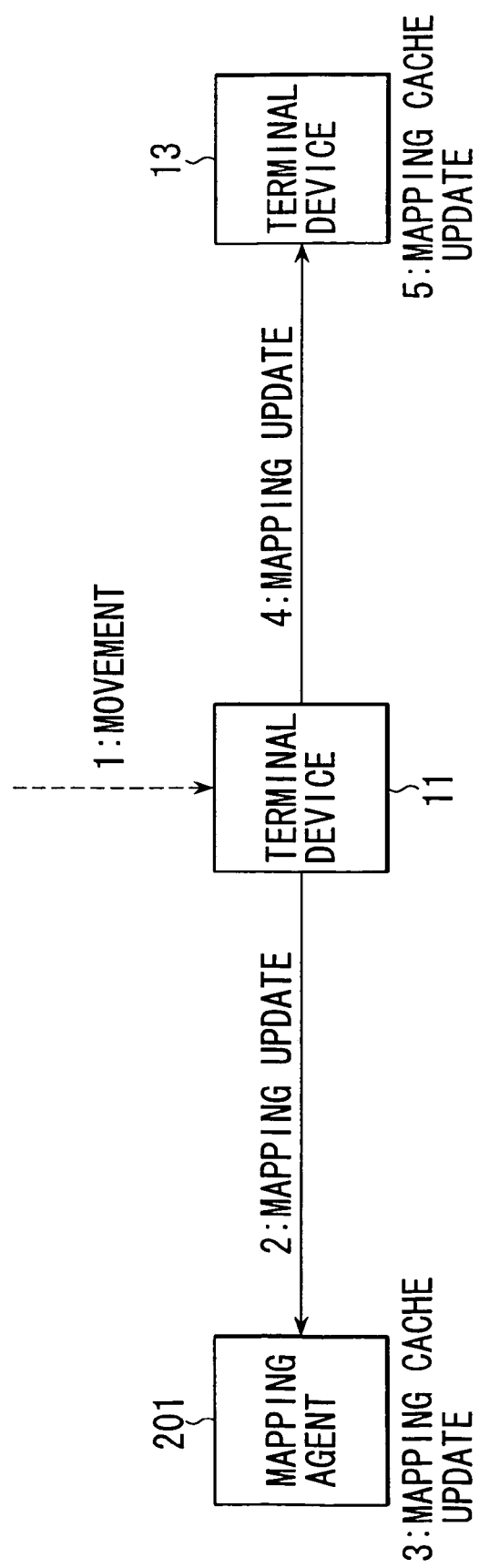
FIG. 47 is a diagram describing the operation when updating the mapping cache in the fourth embodiment.

The processing to update mapping cache in the fourth embodiment is next described while referring to FIG. 47.

When the terminal device 11 has moved, the terminal 11 acquires the position indicator corresponding to a wireless subnetwork 17 of the movement destination from the base station 16 forming the wireless subnetwork 17 of the movement destination. The terminal device 11 generates a mapping update packet for mapping agent 201 whose authentication header shown in FIG. 29 has been stored in the extension header and transmits the mapping update to the mapping agent 201.

The mapping agent 201 determines whether or not the authentication data stored in the authentication header of the received mapping update packet is correct. If the authentication data is determined to be correct, the mapping agent 201 registers in the mapping cache, the current position indicator set in the received mapping update packet.

The terminal device 11 generates a mapping update packet for a terminal device 13, whose authentication header has been stored in the extension header, and transmits the mapping update packet to the terminal device 13.

The terminal device 13 determines whether or not the authentication data stored in the authentication header of the received mapping update packet is correct. If the authentication data is determined to be correct, the terminal device 13 registers in the mapping cache, the current position indicator set in the received mapping update packet.

Figure 48:
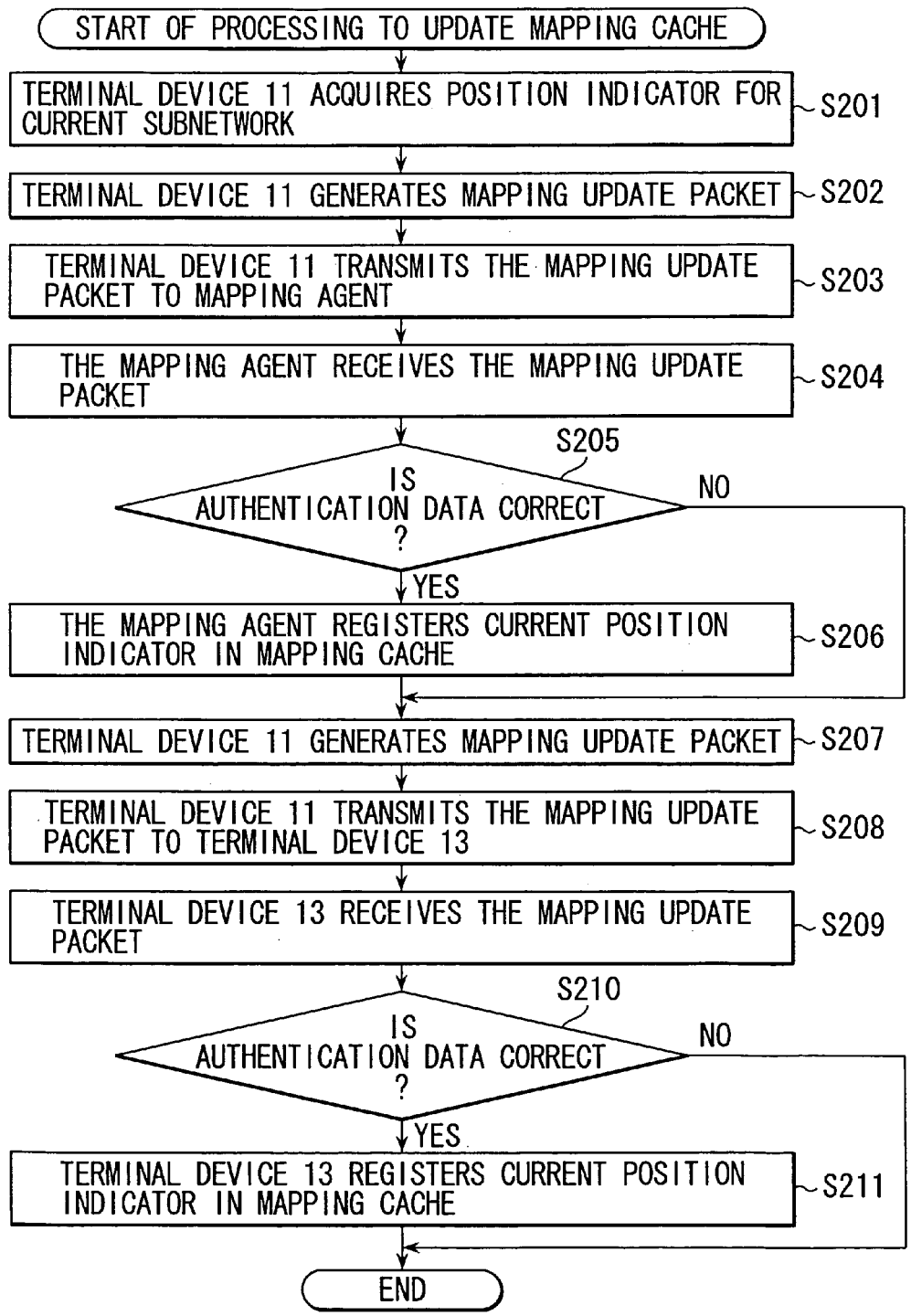
FIG. 48 is a flowchart illustrating the process for updating the mapping cache in the fourth embodiment.

The processing to update mapping cache in the fourth embodiment is described while referring to the flowchart in FIG. 48. In step S201, the terminal device 11 acquires the position indicator of the current subnetwork from the base station 16 forming the wireless subnetwork 17 of the movement destination. In step S202, the terminal device 11 generates a mapping update packet for mapping agent 201. In step 203, the terminal device 11 transmits the mapping update packet to the mapping agent 201.

In step S204, the mapping agent 201 receives the mapping update packet transmitted by the terminal device 11. In step S205, the mapping agent 201 determines whether or not the authentication data included in the received mapping update packet. If the authentication data is determined to be correct, the operation proceeds to step S206, and the mapping agent 201 registers in the mapping cache, the position indicator included in the mapping update packet, then the operation proceeds to S207.

In step S205, if the authentication data is determined to be incorrect, the position indicator included in the mapping update packet is not always correct, so processing in step S206 is skipped, and the operation proceeds to step S207.

In step S207, the terminal device 11 generates a mapping update packet for the terminal device 13. In step S208, the terminal device 11 transmits the mapping update packet to the terminal device 13.

In step S209, the terminal device 13 receives the mapping update packet. In step S210, the terminal device 13 determines whether or not the authentication data included in the received mapping update packet. If the authentication data is determined to be correct, the operation proceeds to step S211 and the terminal device 13 registers in the mapping cache, the position indicator included in the mapping update packet, then the processing ends.

In step S210, if the authentication data is determined to be incorrect, the position indicator included in the mapping update packet is not always correct, so processing in step S211 is skipped, and the operation proceeds to step S212.

As described above, the mapping agent 201 and the terminal device 13 update the mapping cache based on the position indicator included in the mapping update packet transmitted from the terminal device 11. In communication processes after the updating, a packet the terminal device 13 transmits to the terminal device 11 passes through an optimum route.

Figure 49:
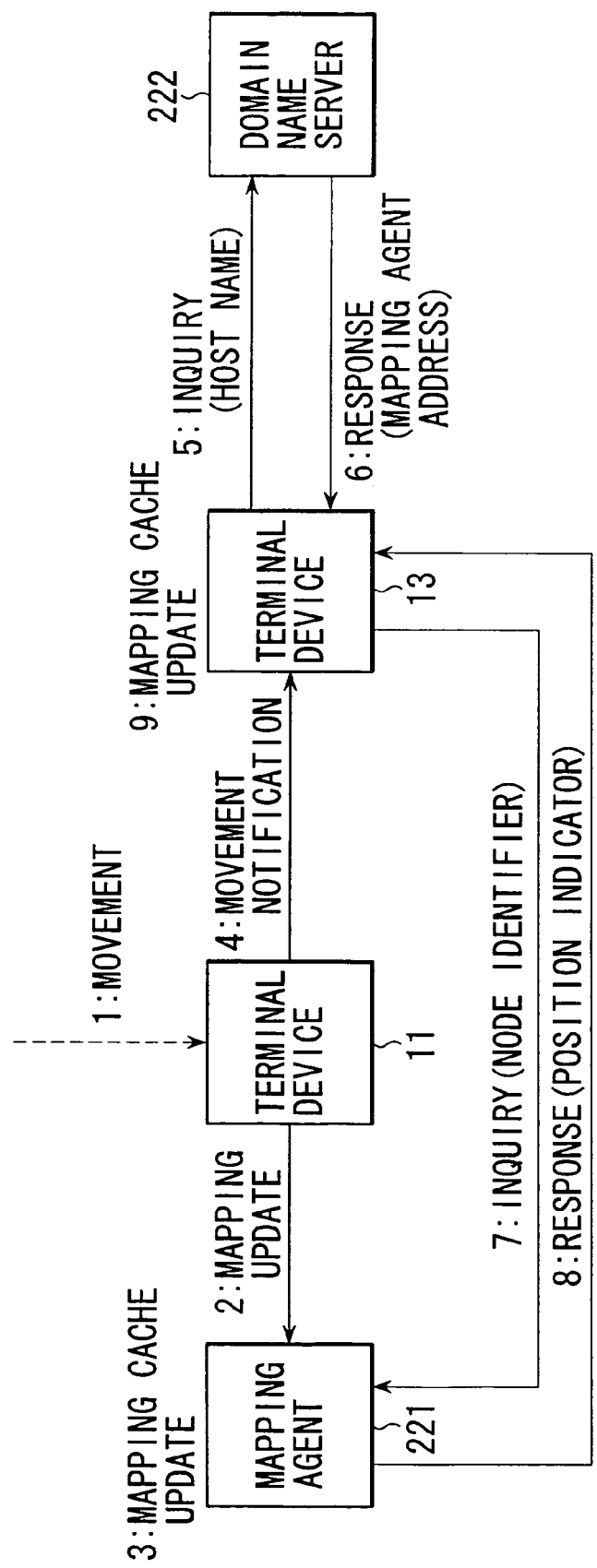
FIG. 49 is a diagram describing the operation when updating the mapping cache in the fifth embodiment.

The processing to update mapping cache in the fifth embodiment is next described while referring to FIG. 49.

When the terminal device has moved, the terminal device 11 acquires the position indicator corresponding to a wireless subnetwork 17 of the movement destination from the base station 16 forming the wireless subnetwork 17 of the movement destination. The terminal device 11 generates a mapping update packet for mapping agent 221 whose authentication header shown in FIG. 29 has been stored in the extension header and transmits the mapping update to the mapping agent 221.

The mapping agent 221 determines whether or not the authentication data stored in the authentication header of the received mapping update packet is correct. If the authentication data is determined to be correct, the mapping agent 221 registers in the mapping cache, the current position indicator set in the received mapping packet.

The terminal device 11 generates a movement notification packet and transmits it to the terminal device 13.

Figure 50:
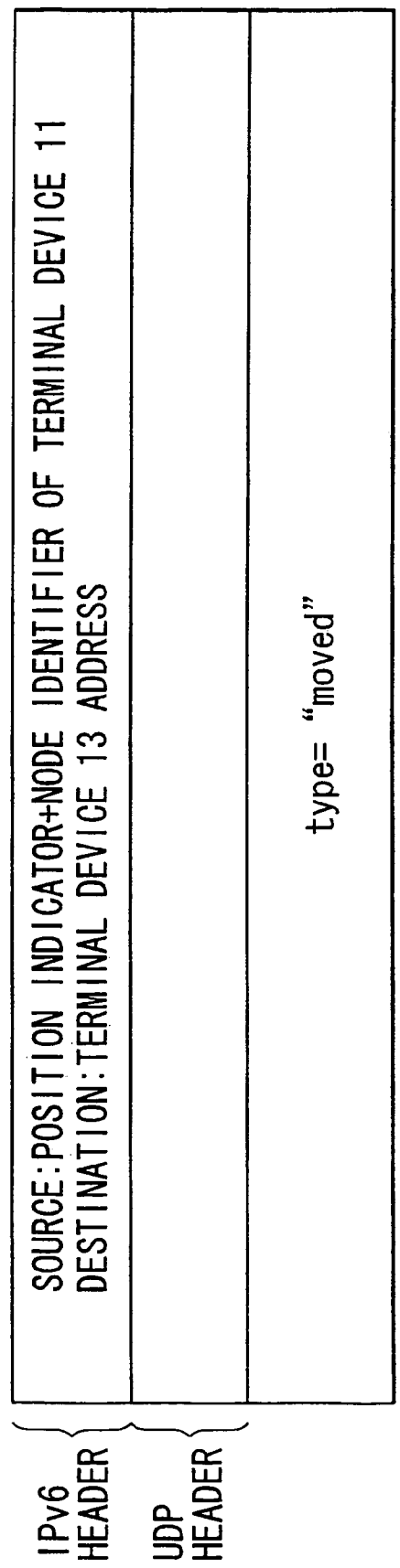
FIG. 50 is a diagram showing an example of a movement notification packet.

FIG. 50 shows an example of a movement notification packet the terminal device 11 transmits to the terminal device 13. The movement notification packet is, for example, formed by attaching a user datagram protocol (UDP) header and an IPv6 header to the data indicating the effect that the device 11 has moved. The movement notification packet does not include an authentication header. The movement notification packet provided with the UPD header is communicated by means of a connectionless-mode protocol. The address obtained by linking the position indicator and node identifier of the terminal device 11 as the source and the address of the terminal device 13 as the destination have been specified in the IPv6 header of the movement notification packet.

The terminal device 13 inquires about the IPv6 address of the mapping agent 221 associated with the terminal device 11 to the domain name server 222 indicating the host name or node identifier of terminal device 11. Like the domain server 144, the domain server 222 stores the IPv6 address of the mapping agent 221 associated with the terminal device 11 corresponding to the host name or the node identifier, and therefore the domain server 222 transmits the read IPv6 address of the mapping agent 221 associated with the terminal device 11 to the terminal device 13.

The terminal device 13 inquires about the current position indicator of the terminal device 11 to the mapping agent 221 indicating the node identifier of the terminal device 11 based on the IPv6 address corresponding to the mapping agent 221 received from the domain server 222.

In response to the inquiry, the mapping agent 221 transmits the current position indicator of the terminal device 11 to the terminal device 13 because the mapping agent 221 stores the current position indicator of the terminal device 11 corresponding to the node identifier of the terminal device 11. The terminal device 13 registers in the mapping cache, the current position indicator of the terminal device 11 received from the mapping agent.

Figure 51:
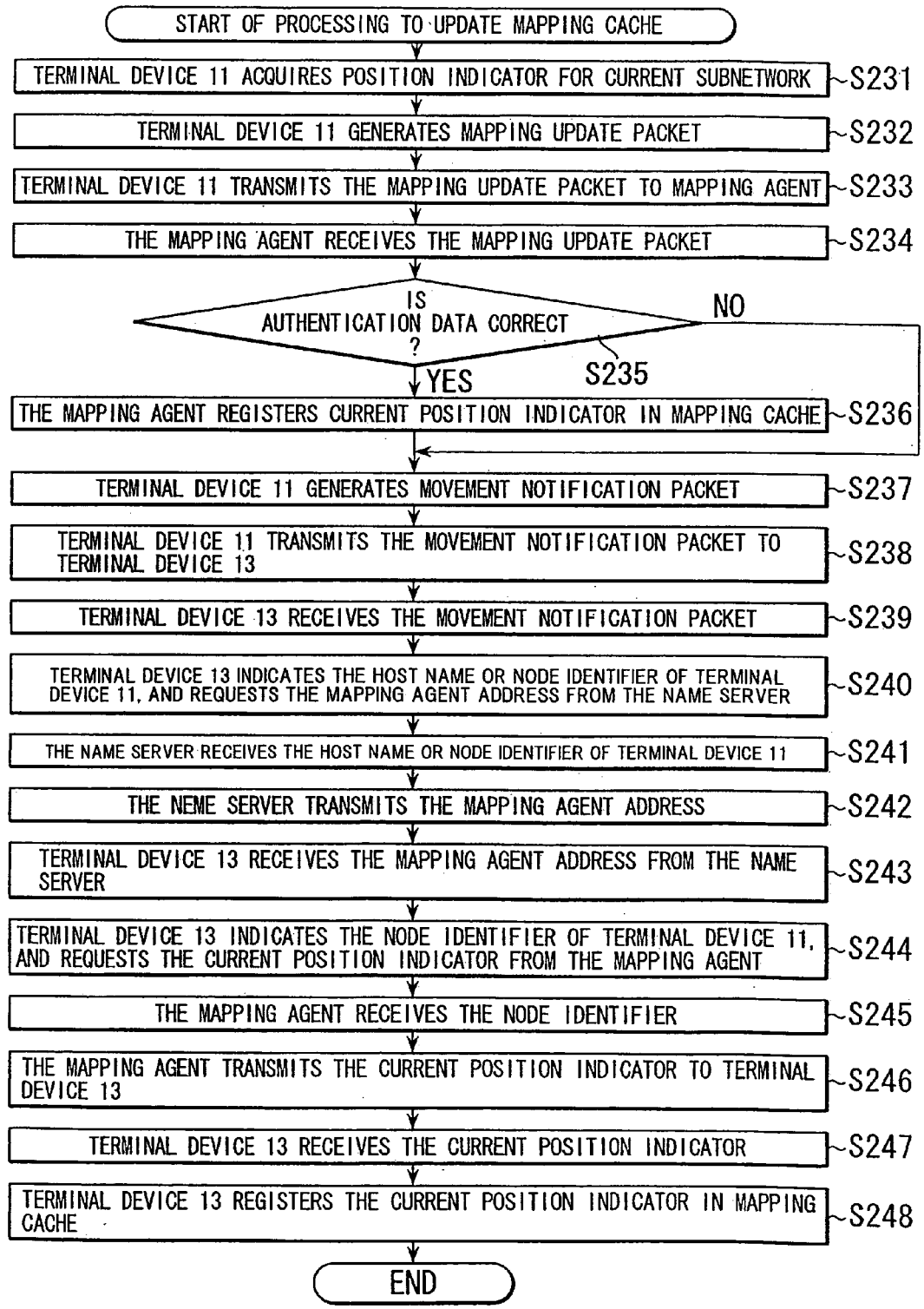
FIG. 51 is a flowchart describing the process for updating the mapping cache in the fifth embodiment.

The processing to update the mapping cache in the fifth embodiment is described while referring to the flowchart in FIG. 51. The description of respective processes in steps S231 to S236 is omitted because they are the same as those in steps S201 to S206 shown in FIG. 48.

In step S237, the terminal device 11 generates a movement notification packet for the terminal device 13. In step S238, the terminal device 11 transmits the movement notification packet to the terminal device 13.

In step S239, the terminal device 13 receives the movement notification packet transmitted from the terminal device 11. In step S240, the terminal device 13 makes a request for the address of the mapping agent 221 to the domain name server 222 indicating the host name or node identifier of the terminal device 11.

In step S241, the domain name server 222 receives the host name or node identifier of the terminal device 11. In step S242, the domain name server 222 transmits the address of the mapping agent 221 to the terminal device 13.

In step S243, the terminal device 13 receives the address of the mapping agent 221 transmitted by the domain name server 222. In step S244, the terminal device 13 makes a request for the current position indicator corresponding to the terminal device 11 to the mapping agent 221 indicating the node identifier of the terminal device 11.

In step S245, the mapping agent 221 receives the node identifier of the terminal device 11 transmitted by the terminal device 13. In step S246, the mapping agent 221 transmits the current position indicator corresponding to the terminal device 11 to the terminal device 13.

In step S247, the terminal device 13 receives the current position indicator corresponding to the terminal device 11 transmitted by the mapping agent 221.

In step 248, the terminal device 13 registers the current position indicator received from the mapping agent 221 in the mapping cache, and the operation ends.

In subsequent communication processes, a packet the terminal device 13 transmits to the terminal device 11 passes through an optimum route.

As describe above, in Mobile Ipv6, if no security association is established between the movement node and the communication party node, a packet from the communication party to the movement node passes through a redundant route. However, in the network system according to the present invention, even if no security association is established between the terminal device 11 (corresponding to the movement node) and the terminal device 13 (corresponding to the communication party node), the packet transmitted from the terminal device 13 to the terminal device 11 passes through an optimum route.

The above series of processes were implemented by hardware however these processes can also be implemented with software. When implementing the processing by software, the software is installed from a recording medium into a general-purpose personal computer capable of executing the various functions, and the programs comprising that software can be installed or can be dedicated software incorporated into a computer.

This recording medium as shown in FIG. 19 or FIG. 20, is not only comprised of a package medium consisting of a magnetic disk 61 or magnetic disk 111 (including floppy disk), an optical disk 62 or an optical disk 112 (CD-ROM {Compact Disk Read Only Memory} and DVD {Digital Versatile Disk}), an optical magnetic disk 63 or an optical magnetic disk 113 (MD{Mini-Disk}), or a semiconductor 64 or a semiconductor memory 114, on which is recorded the program to provide to the user separate from the computer, but may also be provided to the user already incorporated into a computer such as on a ROM32 or a ROM82 or an HDD41 recorded with the program.

In these specifications, the steps listing the program stored in the recording medium may of course be processed in a time sequence in the order the steps are listed. However these steps need not always be processed in a time sequence and may be processed in parallel or individually.

In these specifications, the term system is used to refer to the entire device unit comprised of a plurality of devices.

What is claimed is:

1. An information processing device comprising:
a first terminal device;
a second terminal device;
a plurality of provision devices;
storage means for storing a first data including a host name or node identifier of the first terminal device and a third data including the position of at least one of the provision devices, said provision devices providing a second data including a previous position and a current position of the first terminal device;
receive means to receive a transmit request for the third data and the first data corresponding to the first terminal device, transmitted along with the host name or node identifier of the first terminal device from a second terminal device;
selection means to select the first data corresponding to the first terminal device stored in the storage means and to select the third data showing the position of at least one of the provision devices when the transmit request is received from the receive means;

a transmit means to transmit the first data and third data selected by the selection means, to the second terminal device; and authentication means for authenticating, wherein the second terminal device transmits a data packet to the first terminal device based on the second data stored by the provision device associated with the third data transmitted to the second terminal device.

2. An information processing method for an information processing device for storing a first data for designating a first terminal device corresponding to a host name or node identifier of the first terminal device, as well as for storing a third data showing the position of at least one of a plurality of provision devices, the provision devices providing a second data including a previous position and a current position of the first terminal device, comprising:

receiving a transmit request for the third data and the first data corresponding to the first terminal device, transmitted along with the host name or node identifier of the first terminal device, from the second terminal device;

selecting the first data corresponding to the first terminal device stored in the storage means and the third data showing the position of at least one of the provision devices when the transmit request is received from a receive means;

transmitting the first data and third data selected by the selection means, to the second terminal device; and transmitting a data packet from the second terminal device to the first terminal device based on the second data stored by the provision device associated with the third data transmitted to the second terminal device.

3. A recording medium recorded with a computer-loadable information processing program of an information processing device far storing a first data for designating a first terminal device corresponding to a host name or node identifier of the first terminal device, as well as for storing a third data showing the position of at least one of a plurality of provision devices, the provision devices providing a second data including a previous position and a current position of the first terminal device, the recording medium comprising program instruction which, when executed, perform the method of:

receiving a transmit request for the third data and the first data corresponding to the first terminal device, transmitted along with the host name or node identifier of the first terminal device, from a second terminal device;

selecting a first data corresponding to the first terminal device stored in the storage means and a third data showing the position of at least one of the provision devices when the transmit request is received from a receive means;

transmitting the first data and third data selected by the selection means, to the second terminal device; and transmitting a data packet from the second terminal device to the first terminal device based on the second data stored by the provision device associated with the third data transmitted to the second terminal device.

4. An information processing device, comprising:

first transmit means for transmitting a transmit request for a second data showing a position of at least one of a plurality of first provision devices, as well as a first data designating a terminal device, to a second provision device along with a name or node identifier of the terminal device;

first receive means for receiving the second data showing the position of at least one of the first provision devices as well as the first data for designating the terminal device from a second terminal device;

second transmit means for transmitting a request for transmission of a third data designating a previous position and a current position of the terminal device, along with the first data designating the terminal device, to any of the first provision devices; and second receive means for receiving the third data designating the position of the terminal device from any of the first provision devices.

5. An information processing method comprising:

transmitting a request for a second data showing a position of at least one of a plurality of first provision devices, as well as a first data designating a terminal device, to a second provision device along with a name or node identifier of the terminal device;

receiving the second data showing the position of at least one of the first provision devices as well as the first data for designating the terminal device from a second terminal device;

transmitting a request for transmission of a third data designating a previous position and a current position of the terminal device, along with the first data designating the terminal device, to any of the first provision devices; and receiving the third data designating the position of the terminal device from any of the first provision devices.

6. A recording medium recorded with a computer-loadable information processing program, wherein said computer-loadable information processing program comprises:

transmitting a request for a second data showing a position of at least one of a plurality of first provision devices, as well as a first data designating a terminal device, to a second provision device along with a name or node identifier of the terminal device;

receiving second data showing the position of at least one of the first provision devices as well as first data for designating the terminal device from a second terminal device;

transmitting a request for transmission of a third data designating a previous position and a current position of the terminal device, along with the first data designating the terminal device, to any of the first provision devices; and receiving the third data designating the position of the terminal device from any of the first provision devices.

7. An information processing device, comprising:

first receive means for receiving a first data designating a terminal device and a second data showing movement from said terminal device;

first transmit means for transmitting a request for transmission of a third data showing a position of at least one of a plurality of first provision devices along with a name or node identifier of said terminal device to a second provision device;

second receive means for receiving said third data showing the position of at least one of said first provision devices from said second provision device;

second transmit means for transmitting a request for transmission of a fourth data designating a previous position and a current position of said terminal device, along with said first data designating said terminal device, to any of said first provision devices; and third receive means for receiving said fourth data designating the position of said terminal device from any of said first provision devices.

8. An information processing device is claimed in claim 7, wherein said first receive means receives said first data and said second data based on connectionless-mode protocol.

9. An information processing method comprising:
receiving a first data designating a terminal device and a second data showing movement from said terminal device;
transmitting a request for transmission of a third data showing a position of at least one of a plurality of first provision devices along with a name or node identifier of said terminal device to a second provision device;
receiving said third data showing the position of said at least of the first provision devices from said second provision device;
transmitting a request for transmission of a fourth data designating a previous position and a current position of said terminal device, along with said first data designating said terminal device, to any of said first provision devices; and
receiving said fourth data designating the position of said terminal device from any of said first provision devices.

10. A recording medium recorded with a computer-loadable information processing program, wherein said computer-loadable information processing program comprises:
receiving a first data designating a terminal device and a second data showing movement from said terminal device;
transmitting a request for transmission of a third data showing a position of at least one of a plurality of first provision devices along with a name or node identifier of said terminal device to a second provision device;
receiving said third data showing the position of at least one of said first provision devices from said second provision device;
transmitting a request for transmission of a fourth data designating a previous position and a current position of said terminal device, along with said first data designating said terminal device, to any of said first provision devices; and
receiving said fourth data designating the previous position and the current position of said terminal device from any of said first provision devices.

* * * * *